(12) United States Patent
Handshoe

(10) Patent No.: US 9,576,751 B1
(45) Date of Patent: Feb. 21, 2017

(54) MOTORIZED VACUUM ISOLATION SWITCH

(71) Applicant: Sam Handshoe, Catlettsburg, KY (US)

(72) Inventor: Sam Handshoe, Catlettsburg, KY (US)

(73) Assignee: Becker Mining America, Inc., Barboursville, WV (US)

( * ) Notice: Subject to any disclaimer, the term of this patent is extended or adjusted under 35 U.S.C. 154(b) by 0 days.

(21) Appl. No.: 14/656,920

(22) Filed: Mar. 13, 2015

Related U.S. Application Data

(63) Continuation-in-part of application No. 14/033,016, filed on Sep. 20, 2013.

(60) Provisional application No. 61/703,459, filed on Sep. 20, 2012.

(51) Int. Cl.

| | |
|---|---|
| H02B 11/02 | (2006.01) |
| H01H 3/26 | (2006.01) |
| H01H 9/16 | (2006.01) |
| H01H 9/24 | (2006.01) |
| H02B 11/28 | (2006.01) |
| H02B 11/00 | (2006.01) |
| H02B 11/10 | (2006.01) |

(52) U.S. Cl.
CPC .............. *H01H 3/26* (2013.01); *H01H 9/16* (2013.01); *H01H 9/24* (2013.01); *H02B 11/00* (2013.01); *H02B 11/02* (2013.01); *H02B 11/10* (2013.01); *H02B 11/28* (2013.01); *H01H 2003/266* (2013.01)

(58) Field of Classification Search
CPC .......................................... H02B 11/00–11/28
USPC .................................................. 361/605–621
See application file for complete search history.

(56) References Cited

U.S. PATENT DOCUMENTS

| | | |
|---|---|---|
| 2,554,510 A | 2/1951 | Spicer |
| 2,982,827 A | 5/1961 | Goetz |
| 3,274,356 A | 9/1966 | Godfrey |
| 3,716,684 A | 2/1973 | McMillen |

(Continued)

OTHER PUBLICATIONS

Siemens, 5kV and 15kV Vacuum Circuit Breakers Type GMI, Instruction, Installation, Operation, Maintenance, SG-3268-01, 46 pages.

(Continued)

*Primary Examiner* — Ramon M Barrera
(74) *Attorney, Agent, or Firm* — Phyllis K Wood; PK Wood Law Office, LLC

(57) ABSTRACT

Methods, systems, devices for a motorized isolation switch including a switch enclosure with a set of fixed insulated floating input line connectors and output load connectors movably fixed to the rear panel, a removable contactor bucket insertable into the isolation switch enclosure with mating movable insulated line terminals and load terminals and a set of insulated circuit interrupters, a motorized rack and pinion assembly connected to a base of the switch enclosure, coupled for moving a contactor pan connectable to the contactor bucket along a stationary rack gear along the base of the switch enclosure between and switch open position and a switch closed position, an insulating grounding block with ground connectors, the contactor bucket with corresponding movable ground terminals to mate with the insulated ground connectors in the switch open position, and ancillary controls for communicating with remotely located controls to electrically control the operation.

19 Claims, 20 Drawing Sheets

(56) References Cited

U.S. PATENT DOCUMENTS

| | | | |
|---|---|---|---|
| 3,896,353 A | 7/1975 | Burton | |
| 4,482,936 A | 11/1984 | Saito | |
| 6,031,192 A | 2/2000 | Liebetruth | |
| 6,127,742 A | 10/2000 | Weynachter | |
| 6,169,653 B1 | 1/2001 | Engel | |
| 8,760,853 B1* | 6/2014 | Bullock | H02B 11/04 200/50.21 |

OTHER PUBLICATIONS

SAIT Mining SA—User Manual CPS 3.3kV, 1998, 22 pages.
Cutler-Hammer, Motor Control Assemblies Medium Voltage Starters (AMPGARD), 2001, 7 pages
Cutler-Hammer, Medium-Voltage Distribution Equipment Metal-Clad Switchgear—Drawout Vacuum Breakers (VCP-W), 2001, 20 pages.
Cutler-Hammer, DS/DSII Low Voltage Switchgear Renewal Parts, 1998, 20 pages.
Cutler-Hammer, Type DSII Metal-Enclosed Low Voltage Switchgear, Technical Data, 2000, 48 pages.
Rockwell Automation, Technical Data, Draw-out Versus Fixed Mounted Contactors, 2002, 4 pages.
Westinghouse, Receiving, Operation, Maintenance, Instructions De-ion Air Circuit Breaker, Type DH, Horizontal Drawout Indoor and Outdoor Service, 1953, 70 pages.
Westinghouse, Standardized Metal-Clad Switchgear, with type DH Magnetic De-ion Air Circuit Breakers, 1961.
Westinghouse, Instructions for Type VCP Vacuum Circuit Breakers, 1982, 29 pages.
Powercon Corp, Instruction Book, Horizontal Drawout Metal-Clad Switchgear with Westinghouse Vacuum Circuit Breakers, 1990, 16 pages.
Powell Apparatus Service, Specification for Westinghouse DHP Circuit Breakers, 2004, 7 pages.
VersaRupter Family, Installation/Maintenance Instructions, 2002, 26 pages.
Circuit Interruption Techniques, Advantages of Federal Pacific Circuit Interruption Technique, Switchgear Components, 2004, 30 pages.
Schneider Electric, Type HVL Load Interrupter Switch, Instruction Bulletin, 1993-2005, 20 pages.
S&C Mini-Rupter Switches: Indoor Distribution (4.16 kv through 25 kv), Instructions for Installation, 1982, 12 pages.
Metal-Enclosed Switchgear Indoor and Outdoor Distribution 5kV through 38 kV, Metal-Enclosed Switchgear—Advantages, 2009, retrieved from http://www.federalpacific.com/literature/sgear/09manualmetalenc.pdf, 11 pages.
General Electric, IC7160 Limitamp: Controllers with Draw-out Vacuum Contactor, Instructions, 1983, 10 pages.
Powell, Class E2 Medium-Voltage Controllers with Drawout Vacuum Contactors, Instructions, 2004, 48 pages.
Line Power, Vacuum Circuit Breakers and Feeder Protectors, retrieved on Oct. 21, 2013, retrieved from http://linepower.com/products/Circuit%20 Breakers%20and%20Feeder%20Protectorts/circ . . . , 7 pages.
Federal Pacific, MAVRiC: Vacuum Fault Interrupters, 2012 retrieved on Oct. 23, 2013, retrieved from http://www.federalpacific.com/literature/sgear/PC-11A-310.pdf, 8 pages.
Federal Pacific, Auto-jet Loadbreak Switches, retrieved on Oct. 23, 2013, retrieved from http://www.federalpacific.com/productcart/pc/viewPrd.asp?idcategory=17&product=26, 4 pages.
Cutler Hammer, Type PSI/II Pad-Mount Switchgear, 1998, 11 pages.
Sunbelt Transformer, Type PSI/II Pad-Mount Switchgear: Instructions for Installation and Operation, 2006, 16 pages.
Line Power, DTS Down Time Saver, retrieved on Oct. 21, 2013, retrieved from http://linepower.comliterature/pdf/LPMS-DTS.pdf, 3 pages.
Line Power, DTS Down Time Saver, retrieved on Oct. 21, 2013, retrieved from http://www.federalpacific.com/literature/lineup/LPMS-DTS-0606.PDF, 2 pages.

* cited by examiner

MOTORIZED VACUUM ISOLATION SWITCH

This applicant is a continuation-in-part of U.S. patent application Ser. No. 14/033,016 filed on Sep. 20, 2013 which claims the benefit of priority to U.S. Provisional Application No. 61/703,459 filed on Sep. 20, 2012. The entire disclosure of each of the applications listed in this paragraph are incorporated herein by specific reference thereto.

FIELD OF THE INVENTION

This invention relates to rack mountable electrical switching equipment and, in particular, to methods, systems and devices for an insulated motorized vacuum isolation switch for connecting and disconnecting high voltage electrical power with an electro-mechanical lockout mechanism operated using an automatic or remotely operated power switching assembly coupled with the motorized vacuum isolation switch.

BACKGROUND

Switchgear is the aggregate of switching devices for a power or transforming station or for electric motor control. A bus is provided, to which are connected the generator (source) and the feeder lines (load). Both generators and feeders are connected to the bus through automatic circuit breakers (interrupters) and disconnecting switches.

Switchgear patents date back as far as U.S. Pat. No. 1,768,535 issued Jul. 1, 1930 which describes an electric switch that is mounted on wheels to be moved into and out of contact with circuit leads such that the movable terminals are caused automatically to be connected electrically with fixed circuit leads when the movable switch is in the inserted position and automatically disconnect when the switch is withdrawn from the stationary enclosing cell.

The electric switch includes a switch lock such that the switch cannot be withdrawn when the locking bar is in its lower most position. When the locking bar is raised, the switch can be withdrawn. The raising means can be a bell crank lever coupled with an operating rod that extends through the cover plate. There is also provided a means (switch operating mechanism) to prevent the unlocking when the switch is closed. The switch operating mechanism can include an operating shaft adapted to be rotated in one direction when the switch is opened and an opposite direction when the switch is closed. The combination of the bell crank lever and switch operating mechanism function such that when the switch is not fully inserted, the operating mechanism cannot close the switch and when the operating mechanism closes the switch, it automatically operates to move the locking bar to lock the switch in position.

U.S. Pat. No. 2,443,669 issued Jun. 22, 1948 discloses a switchgear apparatus that includes a drawout mechanism for securing the removable switchgear in either of its extreme positions or intermediate position between its limits of travel. And to interlock the drawout mechanism and the operating mechanism (actuate by handle disposed in an opening provided in the door) for the removable circuit breaker to prevent improper operation.

As stated in U.S. Pat. No. 2,298,828 issued on Oct. 13, 1942, "[i]n metal-enclosed switchgear of the drawout type, the conventional arrangement comprises a stationary metal housing within which bus bars, cable leads, and accessory apparatus are disposed and a removable unit comprising a circuit breaker which is connected to the busses and incoming and outgoing leads in the operating position of the unit. In this position, so-called primary disconnecting contacts include contacts connected to the buses and incoming or outgoing leads fixedly mounted with respect to the stationary housing and coacting movable contacts carried by the removable unit are in engagement.

The apparatus is also provided with suitable interlocking means generally arranged so that it is impossible to insert or withdraw the removable unit or break connected at the primary disconnecting contacts without first tripping the circuit breaker, and insuring that the circuit breaker is open both when the unit is moved out of and into operative position". The electric switchgear also includes a rack out mechanism, a mechanical interlock to prevent movement of the removable unit with respect to the stationary housing; a trip knob and locking device for tripping the circuit breaker device.

U.S. Pat. No. 2,388,934 issued Nov. 13, 1945 teaches a circuit breaker control mechanism for circuit breakers that are housed in compartments with a door. The CB is mounted on a movable frame or truck. The movable frame carries moving contacts that engage stationary contacts at the rear of the stationary frame for connecting the circuit breakers to the buses and contacts at the rear for control purposes. The patent describes rotating the latch rod to trip all three poles of the circuit breaker, causing them to move to their movable contact arm to the open position by depressing push button provided on the door for manually tripping the circuit breakers when the door is closed. This '934 patent is a divisional of U.S. Pat. No. 2,129,723 filed on Sep. 29, 1936 which issued Sep. 13, 1938.

An early draw out fused switch gear assembly is taught in U.S. Pat. No. 3,274,356. The assembly is adapted to be removably engageable with fixed electrical connectors from a electrical source. Another early patent, U.S. Pat. No. 2,982,827, describes an interlocking mechanism for use with a slidably mounted electrical draw out unit for forward and backward movement between an advanced and a retracted position in which movable contacts of the high voltage supply source that mate with stationary source.

U.S. Pat. No. 3,842,321 issued to Caton on Oct. 15, 1974 clearly describes the conventional high voltage switchgear having a primary supply switching means and operating mechanism, usually in conjunction with a circuit breaker, being mounted partly internal and partly external to the enclosure of a movable housing, with the current inlet and outlet conductors mounted in a stationary housing, which may also contain other electrical equipment, for example bus bars, cable box and instrument transformers.

The two housings can have isolating means such as mating plug and socket contacts for transmitting the primary supply of high voltage electricity through the switching means, the contacts being made or broken according to the relative position of the two housings. With the contacts made, switching is effected by operation of the switching means on the movable housing. Apart from the primary high voltage supply such switchgear includes a number of secondary circuits, generally low voltage control and indicator circuits, which may be fed from current and voltage transformers in the stationary housing and controlled by switches operated in accordance with the state of the primary switching means. When a circuit breaker is incorporated this is usually tripped by energiation of the circuit breaker shunt trip coil by a protective relay, the protective relay energized by an instrument transformer.

In conventional systems the power supplies for secondary circuits are taken from means in the stationary housing, but the elements of the secondary circuit responsive to such power, e.g. trip coils, auxiliary switches and electrical interlocks, are located in the movable housing.

U.S. Pat. No. 5,481,075 issued on Jan. 2, 1996 to Kleinecke et al. discloses a compact motor control (switchgear) with an improved arrangement for disconnecting and withdrawing a drawout unit that includes windows (not shown) through which blades can be viewed to visibly confirm that the isolation switch is open and that the blades are grounded prior to maintenance. U.S. Pat. No. 4,206,329 issued Jun. 30, 1980 shows windows in FIG. 1 for viewing in conjunction with a handle indicator that functions as both a drawout latch pin release and as an indicator that switch operating mechanism is uncoupled.

U.S. Pat. No. 7,277,294 issued to Carlson on Oct. 2, 2007 describes a contactor draw out pan that has a movable frame and a stationary frame which carries the electrical components for an electrical feeder circuit and has input terminals for the incoming electrical power and output terminals for delivering electrical power to equipment operating on the feeder circuit. The movable frame carries the contactors. A disconnect mechanism locks the movable frame relative the stationary frame and provides a primary mechanical means for disengaging electrical current flow through the apparatus. While the contactor draw out pan provides access for repairs, the operator is required to stand in front of the device to mechanically disengage the electrical current flowing between the input and output terminal before the pan can be drawn out for repairs.

Other prior art patents include, U.S. Pat. No. 2,218,555 issued to Rossman on Oct. 22, 1940; U.S. Pat. No. 2,554,510 issued to Spicer on May 29, 1951; U.S. Pat. No. 3,716,684 issued to McMillen on Feb. 13, 1073; U.S. Pat. No. 3,842,321 issued to Caton on Oct. 15, 1974; U.S. Pat. No. 3,896,353 issued to Burton on Jul. 22, 1975; U.S. Pat. Nos. 3,923,197 and 3,983,460 issued to Kuhn on Dec. 12, 1975 and Sep. 28, 1976, respectively; U.S. Pat. No. 3,991,291 issued to McGuffie on Nov. 9, 1976; and U.S. Pat. Nos. 4,002,864; 4,002,865 both issued to Kuhn on Jan. 11, 1977, and U.S. Pat. No. 4,017,698 issued to Kuhn on Apr. 12, 1977; U.S. Pat. No. 4,482,936 issued to Saito Nov. 13, 1984; U.S. Pat. No. 6,127,742 issued Oct. 3, 2000 describes a draw-out electrical switchgear apparatus; and U.S. Pat. No. 6,031,192 issued Feb. 29, 2000 describes a draw out circuit breaker with disconnect position interlock mechanism.

High voltage switching equipment commonly includes a variety of safety features such as barriers between phases to avoid arching between phases and a viewing window to provide line-of-sight to internal components so that a user can monitor the connection status of the switching components when the switching equipment is fully installed in a long wall enclosure.

A power center is a multi-compartment steel enclosure with a bus system to distribute electrical power, on a common bus system, to individual switching equipment units mountable within the compartments. The individual switching equipment are commonly referred to as "buckets" and are typically constructed to be removable, pull-out units that have, or are installed behind, individual sealed doors on the power center enclosure. These buckets can contain various switching control and motor protection components such as motor controls, starters, contactor assemblies, overload relays, circuit breakers, motor circuit protectors, various disconnects, and similar devices for electric motors. The buckets connect to the supply power lines of the power center and conduct supply power to the line side of the switching equipment, for operation of motors. Power centers are most often used in the underground mining industry, which uses high power electrical motors, pumps, and other loads.

A problem with prior art switchgear, circuit interrupters and contactor equipment is the size and weight of the draw out cell/contactor pan also referred to as a contactor bucket. Removal of the prior art contactor buckets from the stationary rack requires multiple screws to be removed, and because of the weight, required two or more operators to remove the draw out cell from the stationary rack or longwall power distribution unit.

To solve the problems associated with the prior art draw out cells, the methods, systems and apparatus of the present invention includes safety features such as a dead front panel, a motorized racking mechanism that can be automatically or remotely operated, insulated internal components to reduce complexity, decrease size and reduce weight while increasing safety. A dead front panel is a panel where all energized components are insulated to protect personnel from electrocution.

SUMMARY OF THE INVENTION

A primary objective of the present invention is to provide methods, systems and devices for a vacuum isolation switch with a motor driven switching contactor pan and a dead front panel that includes a viewing window for viewing both the status of the disconnect switch and a stuck bottle indicator panel.

A secondary objective of the present invention is to provide methods, systems and devices for a slim line motorized vacuum isolation switch with a reduced overall package size and reduced weight for removal and insertion by a single operator.

A third objective of the present invention is to provide methods, systems and devices for a motorized vacuum isolation switch with insulated electrical components to reduce the risk of operator exposure to high voltage potential, reduce complexity and thus reduce the bucket weight and size.

A fourth objective of the present invention is to provide methods, systems and devices for a motorized vacuum isolation switch with an electro-mechanical interlock for automatically locking the removable bucket in a closed and energized position and the open and grounded position.

A fifth objective of the present invention is to provide methods, systems and devices for a motorized vacuum isolation switch with a stuck vacuum bottle indicator to show the condition of the vacuum bottles when the contactor is de-energized.

A sixth objective of the present invention is to provide methods, systems and devices for a motorized vacuum isolation switch with a stuck bottle indicator and a mirror surface for viewing the position of the main incoming line contacts and outgoing load contacts, both viewable from an exterior of the switch.

An embodiment of a contactor bucket for installation into a motorized stationary isolation switch enclosure can include a contactor bucket frame, a rear panel with one or more insulated source terminals and one or more insulated load terminals, each source and load terminal pair corresponding to one phase of an electrical power source, a front panel with one or more grounding terminals, each one corresponding to one phase of the power source, an insulated circuit interrupter for each phase with an input terminal and output terminal and switchable contacts enclosed therein, each one or more insulated source terminals connected to a corresponding circuit interrupter input terminal and each one of the insulated load terminals connected to a corresponding circuit interrupter output terminal and to a corresponding one of the grounding terminals, and a control interface for controlling a position of the one or more insulated circuit interrupter enclosed switchable contacts.

The contactor bucket can include a stuck bottle indicator panel assembly with an indicator corresponding to each one of the insulated circuit interrupters to show an energized state of each corresponding circuit interrupter internal switchable contacts, the indicator panel attached above the one or more grounding terminals.

An embodiment of a motorized isolation switch enclosure can include a frame with a rear panel, two side panels and a removable a front panel, a motorized rack and pinion assembly for moving a contactor pan along a stationary rack longitudinally along the base of the frame, a set of insulated floating input line connector assemblies attached to the rear panel to supply a source voltage to a contactor bucket insertable into the isolation switch enclosure, a corresponding set of insulated floating output load connector assemblies attached to the rear panel spaced apart from the set of floating input line connectors to supply a controlled load voltage from the removable contactor bucket to a load external of the isolation switch enclosure, an insulating grounding block assembly with set of ground connectors connected therewith and a corresponding set of ground wires routed along the isolation switch enclosure between the rear panel set of insulated output load connectors and the set of insulated ground connectors, an electro-mechanical interlock to controllably lock the contactor pan in an open position and a closed position, and a viewing window in the front panel for an operator to view a position of the set of insulated floating input line connectors when the removable contactor bucket is inserted into the isolation switch enclosure.

The rear panel can include a set of skeleton key shaped apertures for each of the set of set of insulated floating input line connectors and a corresponding set of insulated floating output load connectors.

The floating input and output connectors can each include an hour glass shaped insulated connector assembly embedded, the insulated hour glass connector insertable into a larger portion of the skeleton key shaped aperture with the neck of the hourglass shaped insulated connector slidable into the slot portion of the skeleton key shaped aperture to allow the floating input and output connectors to fixedly move within the skeleton key shaped aperture.

The motorized rack and pinion assembly can include a motor engaged to turn a pinion gear, the motor connected to a bottom side of the contactor pan, and a stationary rack gear coupled with the pinion gear to move the contactor pan along the stationary rack The motorized isolation switch enclosure can further include an attachment assembly for attaching a removable contactor bucket to the contactor pan to allow the motorized rack and pinion assembly to move the attached removable contactor bucket between the open position and closed position.

A motorized isolation switch can include a switch enclosure including a frame with a rear panel, two side panels and a front panel, a set of fixed insulated floating input line connectors and a corresponding set of fixed insulated floating output load connectors movably fixed to the rear panel, each one in the set corresponding to a different phase, a removable contactor bucket insertable into the isolation switch enclosure with mating movable insulated line terminals and load terminals and a set of insulated circuit interrupters, each insulated circuit interrupter with an input and an output terminals and switchable contacts therein, the insulated circuit interrupter input and output terminals connected between one of the movable insulated line terminals and load terminals corresponding to each phase, a motorized rack and pinion assembly connected to a base of the switch enclosure, the motorized rack and pinion assembly coupled for moving a contactor pan connectable to the contactor bucket along a stationary rack gear along the base of the switch enclosure between and switch open position and a switch closed position, an insulating grounding block assembly with set of ground connectors insulated therein connected adjacent to the removable front panel, the contactor bucket with a corresponding set of movable ground terminals connected to a front of the contactor bucket to mate with the insulated ground connectors in the switch open position, and ancillary controls for communicating with remotely located controls to electrically control the operation.

The motorized isolation switch can further include a viewing window in the front panel for an operator to view a position of the set of insulated floating input line connectors when the removable contactor bucket is inserted into the isolation switch enclosure.

The motorized isolation switch can further include a stuck bottle indicator panel assembly with an indicator corresponding to each one of the insulated circuit interrupters to show an energized state of each corresponding circuit interrupter internal switchable contacts, the indicator panel attached above the insulating grounding block.

The motorized isolation switch can further include a mirror surface along one side panel of the switch enclosure such that a reflection of the set of fixed insulated floating input line connectors is viewable through the viewing window.

The insulating grounding block assembly can include a corresponding set of ground wires routed along the isolation switch enclosure between the rear panel set of insulated output load connectors and the set of insulated ground connectors, the set of ground wires connected at a single point ground.

The motorized isolation switch can further include an attachment assembly for attaching the removable contactor bucket to the contactor pan to allow the motorized rack and pinion assembly to move the attached removable contactor bucket between the open position and closed position.

The attachment assembly can include two spring loaded contactor bucket interlock plunger pins, one on each of the right and left front sides of the movable contactor pan that mate with corresponding apertures in the front side panels of the contactor bucket to allow for quick removal of the contactor bucket.

The attachment assembly can further include a pan keyway on each of the right and left rear side panels to mate with right and left shoulder bolts on the rear of the contactor pan to allow for quick removal of the contactor bucket.

The motorized rack and pinion assembly can include a motor connected to rotate a pinion gear, the motor and pinion gear connected to the bottom side of the contactor pan, and a rack gear connected to the base of the switch enclosure coupled with the pinion gear such that as the pinion gear is rotated by the motor, the contactor pan moves between the switch open and switch closed position.

The motorized isolation switch can further include an electro-mechanical interlock connected to the bottom side of the contactor pan to controllably lock the contactor pan in one of the open position and the closed position.

The electro-mechanical interlock can include an electro-mechanical solenoid with a plunger pin to mate with an open position aperture and a closed position for controllably interlock the contactor pan in position.

The motorized isolation switch can further include a control connector attached to the contactor bucket for controlling the motorized rack and pinion assembly and the circuit interrupter switchable contacts.

The front panel can be a dead front panel with only insulated electrical components adjacent to the dead front panel.

Further objectives and advantages of this invention will be apparent from the following detailed description of preferred embodiments, which are illustrated, schematically in the accompanying drawings.

DESCRIPTION OF THE PREFERRED EMBODIMENTS

Figure 1:
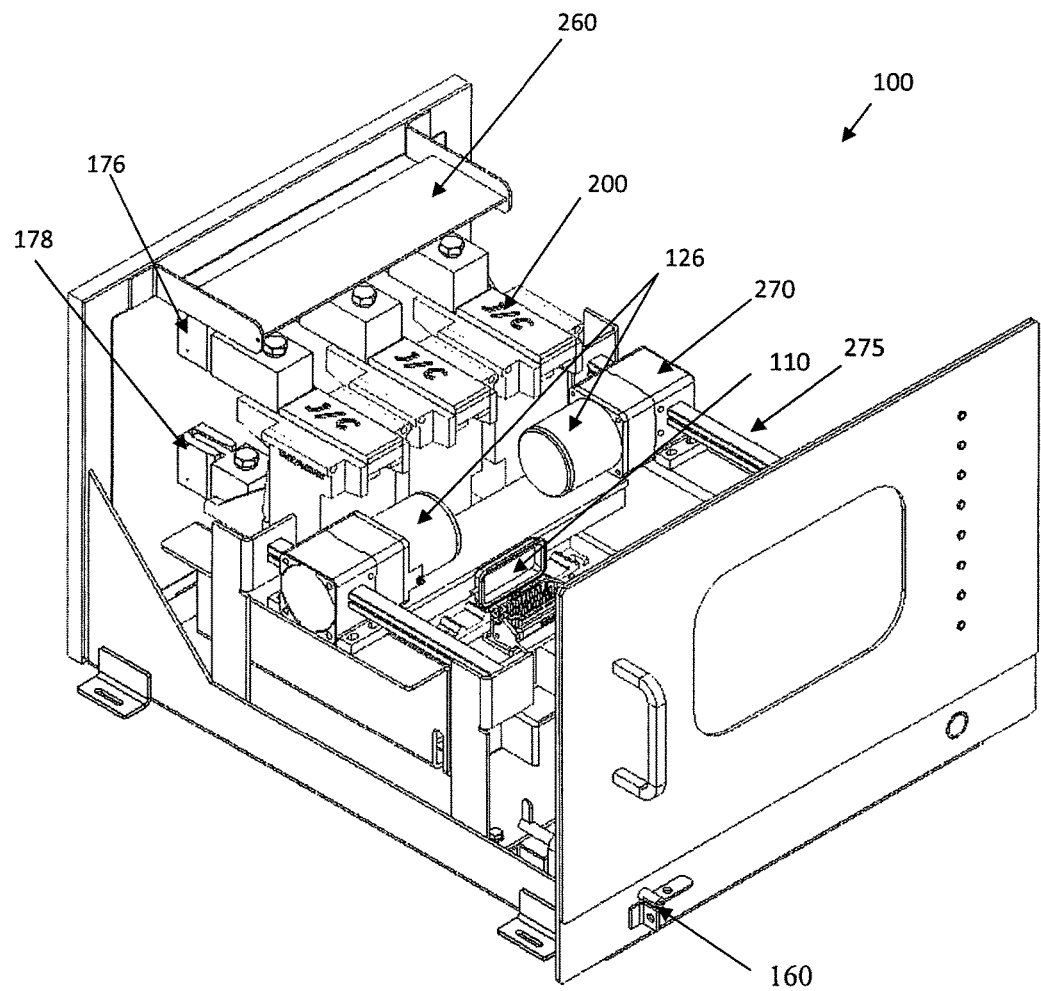
FIG. 1 is a left front perspective view of the motorized removable power cell according to another embodiment of the invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of reference numerals used in the description and the drawings to identify components:
100 removable motor power cell
110 controller signal connector
126 motor
140 rack and pinion assembly
160 lock out assembly
162 lock out lever—rotatable
164 lock out shaft
176 interior stationary upper multi-fork (incoming)
177 movable incoming power blade
178 interior lower multi-fork (outgoing)
179 movable outgoing load blade
200 circuit interrupter
210 bus bar
220 visible disconnect switch blade
230 multi-fork connector (closed and energized)
232 multi-fork connector (outgoing load)
235 multi-fork connector (open and grounded)
237 grounding blade
239 multi-fork grounding connector
240 mechanical interlock assembly
250 main bolt
260 shutter
270 gear box
275 stationary track
280 stationary frame
300 Motorized VIS
310 dead front panel
312 hinged door
314 viewing window
316 stuck bottle indicator
317 indicator
318 mirror
320 rear panel
322 rear floating connector assay
324 skeleton key shaped aperture
326 insulated connector housing
327 hour glass shaped insulating sleeve
328 hour glass shaped insulating sleeve
329 hour glass shaped insulating rear section
330 rear floating insulated line connector
332 rear floating insulated load connector
334 wire post
336 wire terminal lug
338 terminal nut
340 insulating grounding block assembly
342 stationary insulated grounding connectors
344 grounding wires
346 contactor bucket interlock apertures
348 spring loaded contactor bucket interlock plunger pins
349 bucket side interlock aperture
350 contactor bucket
352 insulated circuit interrupters
354 movable grounding terminals
356 insulated movable line terminals
357 movable terminal insulated sleeve
358 insulated movable load terminals
360 quick disconnect assembly
362 control interface connector
364 control disconnect connector
370 motor assembly
372 motor driven pinion gear 374 stationary rack gear
376 movable contactor pan
377 pan keyway
378 interlock block
380 electro-mechanical interlock
382 electro-mechanical solenoid
384 solenoid plunger
386 connected position aperture
388 disconnect position aperture The present invention provides a motorized vacuum isolation switch (power cell) to reduce down time and increase circuit capacity in a very compact design with improved safety to personnel. Although the high voltage power cell of the present invention can be used in a variety of different industrial applications, the following description relates to the use of the power cell in the mining environment. The description and the drawings show examples of removable motor power cells that can be configured for use corresponding to the industry, such as a draw out tray assembly or a bolt in power cell connected directly to an enclosure frame.

A complete high voltage motor circuit is made up of power components (referred to as the power cell) and low voltage control protective relaying components which include a ground fault relay, ground wire monitor, and short circuit and overload relays are located remote from the removable motor power cell in communication with the removable motor power cell via cabling. The configuration of the present invention separates the power components which need to be replaced less often from the protective relaying components which have a much higher failure rate.

The methods, systems and devices of the present invention provide a compact electro-mechanical motorized visible disconnect power cell that can be automatically or remotely operated. In the embodiments shown and described, the power components are sized for 600 amps using vacuum contactors, although they can alternatively be sized, for example for 900 amps or for 300 amps, and can be packaged into a bolt in power cell or a draw out tray assembly that is plugged into a stationary docking station fitted with female receptacles. Those skilled in the art of power distribution will understand that the scope of the invention is not limited to a particular voltage or current, and can be used for power distribution units of different voltages and different number of phases.

Prior art manually operated switches require that the operator have their hands on the switch assembly when operating which also positions them directly in front of the power isolation switch which is not ideal due to a possible arc flash condition if one of the vacuum contactor bottles has failed in the stuck closed position. To solve the problems associated with the prior art power cells, the present invention provides an electro-mechanical switching assembly that can be remotely operated with the operator a safe distance from the power cell.

In an embodiment, the front panel of the power cell includes a window to view the status of the visible disconnect switch blades and below the window is a rotatable lockout lever knob and a mechanical or electro-mechanical interlock. The front panel can also includes plural visual indicators and cover handles on each side for pulling the removable motor power cell from the equipment rack.

The removable motor power cell includes a remotely located and protective relaying cell that interface with the removable motor power cell via a controller connector for initializing the vacuum contactors and controlling the motorized rack pinion assembly for engaging and disengaging of the visual disconnect terminals between the closed and energized position and the open and ground position. The motorized rack and pinion assembly includes a motor that is turned on and off from the remotely operated controller (not shown) that sends and receives control signals via the controller signal multi-contact connector. The controller signal connector also provides power to the motor assembly.

The rear contact panel can includes an upper row of incoming (source) voltage contacts and a lower row of outgoing (load) contacts. The upper row of incoming voltage contacts are electrically isolated from the lower row of outgoing contacts. When the visible disconnect terminals are in a closed position, the upper incoming voltage contacts connect with the vacuum interrupters. The current passes through the vacuum interrupters, across the copper bus bar to the upper connector. In an embodiment, the visible disconnect switch is rotated between a closed and energized position and an open and grounded position. The electro-mechanical motorized rack and pinion assembly rotates the visible disconnect switch blades between the two positions.

In the first embodiment described and illustrated in co-pending U.S. patent application Ser. No. 14/033,016 filed on Sep. 20, 2013 which is incorporated herein by reference hereto, the rack and pinion assembly is used as part of the electro-mechanical automatic power switch to provide precise positioning of the visual disconnect switch when in the closed position or in the open and grounded position. As shown, the rack and pinion assembly includes a rack pinion moving assembly and a lockout assembly. The rack pinion moving assembly includes a pinion coupled with the large sprocket of the motor assembly. The rack pinion moving assembly moves between and upper limit switch (open and grounded) and a lower limit switch (closed and energized).

The removable power cell shown in FIG. 1 includes remote controller signal connector 110, the vacuum contactors and incoming upper power contacts. The power cell includes a circuit interrupter for each phase. The circuit interrupter can be a vacuum interrupter, a circuit breaker or other type of interrupter selected for the application.

The motor is automatically energized via remote signaling. In the closed and energized position, electrical current flows from the incoming electrical source connector through the vacuum interrupter to the outgoing connector connected with the lower outgoing contact to the load. When the power cell is open and grounded, the outgoing connector is switched to make contact with the lower connector that connects with the grounding plane. In this position, any residual current flow from the load (outgoing contact) is grounded.

The rack and pinion assembly includes a moving assembly that connects with the lock out assembly on the front of the power cell. The moving assembly has a switch bracket that moves to contact with an upper limit switch and a lower limit switch which correspond to the open and grounded position and the closed and energized position of the visible disconnect switch blades, respectively. The upper and lower limit switches provide the signaling required for denergizing the motor.

Operationally, an operator at the remote controller initiates a connect operation or disconnect operation, a corresponding incoming signal is received via the controller multi-contact connector to initialize the motor. The motor assembly provides a rotating torque force from the motor assembly moves the rack pinion moving assembly between the upper limit switch and the lower limit switch.

The rack and pinion moving assembly can include the rack and a switch bracket that travels forward and backward with the rack. The pinion is rotated by the linear force from the motor assembly which in turn moves the rack forward and back. The switch bracket is attached to move with the rack until the switch bracket contacts with either the upper limit switch or the lower limit switch, depending on the direction of movement.

One skilled in the art should realize that the particularities in the rack and pinion assembly should not be construed as limitation of the preferred embodiment. Various system configurations and corresponding components may be chosen and optimized for a particular application to achieve a desired performance and other methods to open and close the drawer and safely connect and disconnect the high voltage power to allow for safe maintenance and replacement of the high voltage draw out cell.

Typically, when installing or removing switching equipment buckets, the power supply lines are connected. To remove the bucket, a dead front door of the bucket or of the motor control center is opened and an operator manually pulls on the bucket to separate the primary disconnects, or "stabs," from the bus system to disconnect the power supply. Installation of a bucket is accomplished in a similar manner, wherein the operator manually pushes the bucket into a compartment of the motor control center to engage the bucket stabs with the bus system, thus connecting the system to supply power. In such systems it may be difficult to determine when the bucket is fully disconnected from the power supply.

Attempts have been made to improve upon the manual installation and disconnection of switching equipment buckets and supply power connections from live supply power lines of a longwall enclosure. Other systems have employed pivotable handles inside the buckets to pivot line connectors to and from supply lines. However, many of these systems require that the bucket or compartment door be open to manipulate the handles and line stabs.

FIG. 1 is a left front perspective view of an example of the motorized removable power cell. In the motorized removable power cell shown, the motor assembly includes a left and a right motor 126 and left and right gear box 270 mounted on a movable contactor tray. The gear box contains the rack and pinion assembly and the limit switches. As previously described, the motors 126 receive power, and are initialized by remote signaling via connector 110. The motors 126 are connected with left and right gear boxes 270 and travel along left and right tracks 275 that are mounted on the stationary power cell frame 280 to move the high voltage upper incoming power connectors and corresponding lower outgoing load connectors from the closed and energized position shown in FIG. 1, and an open and grounded position shown in FIG. 4. The movable components mounted on the movable contactor tray in this example can include the controller signal connector 110, the vacuum interrupters 200, the rear upper 177 (incoming) and lower (outgoing) 179 power blades, and corresponding grounding blades 237.

Figure 2:
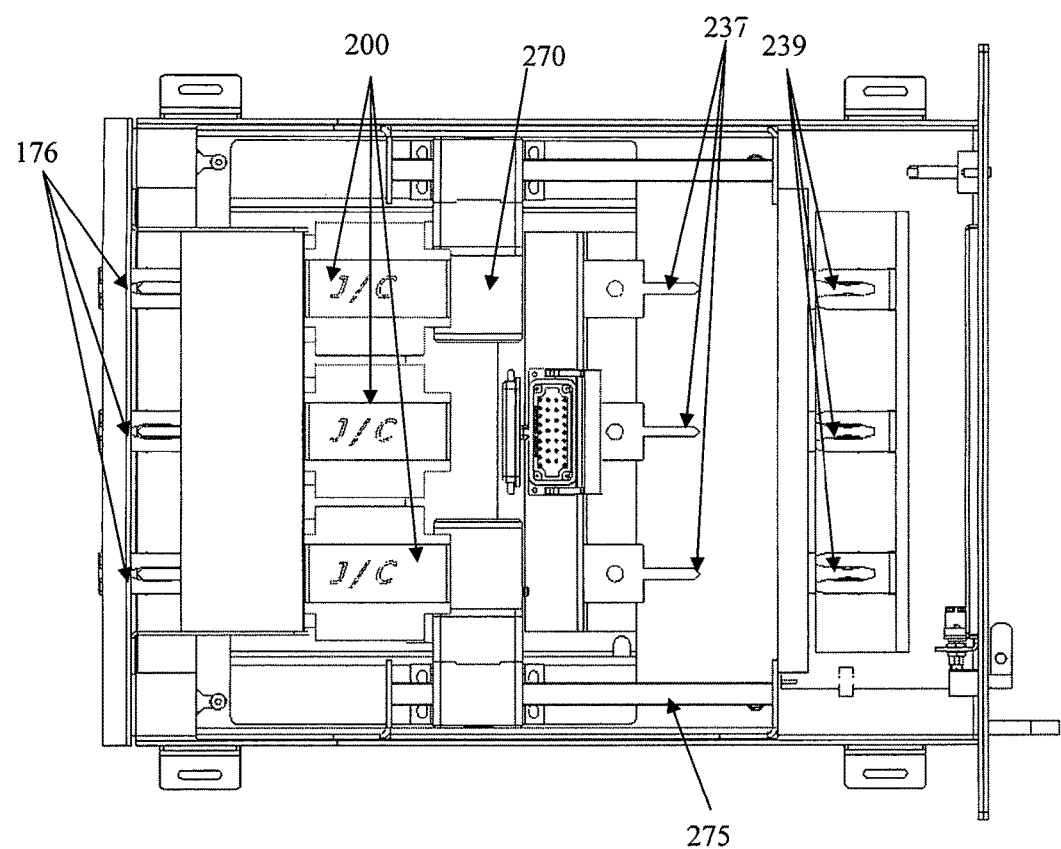
FIG. 2 is a top view of the motorized removable power cell closed and energized.

FIG. 2 is a top view of the motorized removable power cell closed and energized. In the example shown, stationary grounding multi-fork connectors 239 mate with moving grounding blades 237 when the motorized power cell is in the open and grounded position. As described in the previous example, each gear box 270 includes limit switches to limit the travel of the movable contactor tray 300 across the stationary tracks 275.

Figure 3:
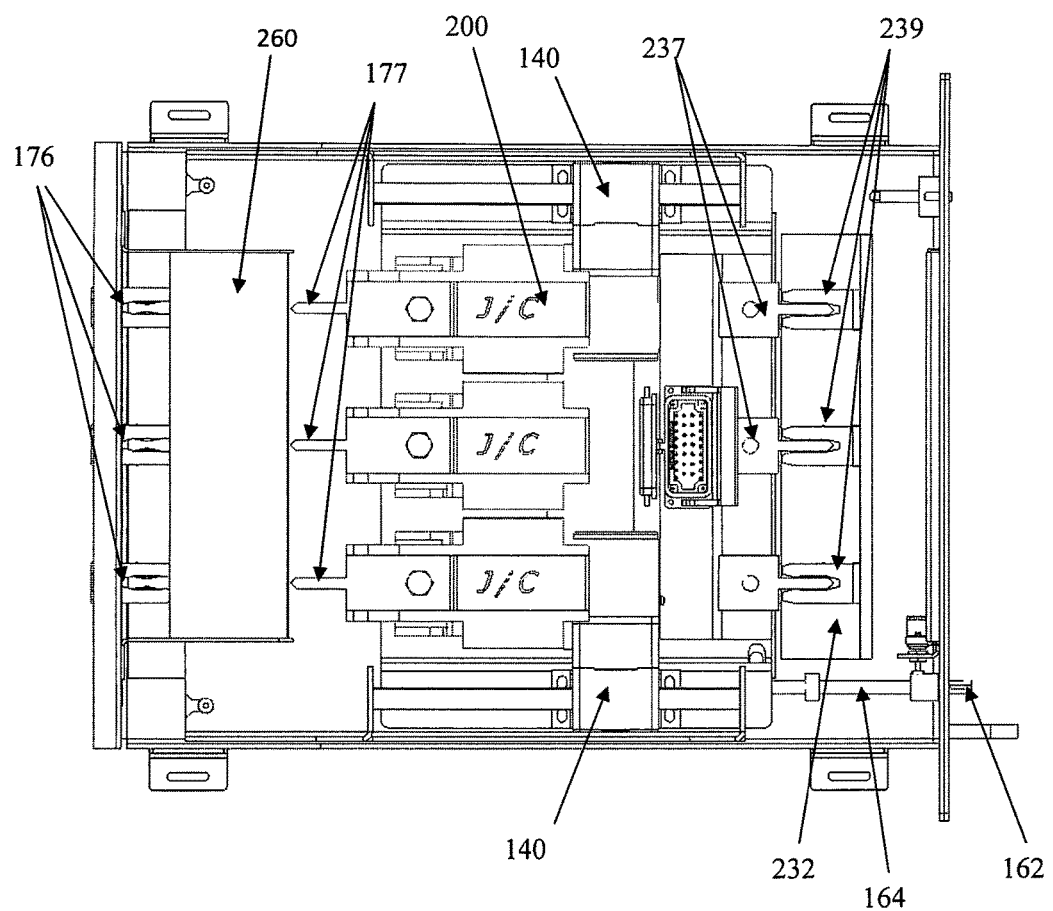
FIG. 3 is a top view of the motorized removable power cell open and grounded.
Figure 4:
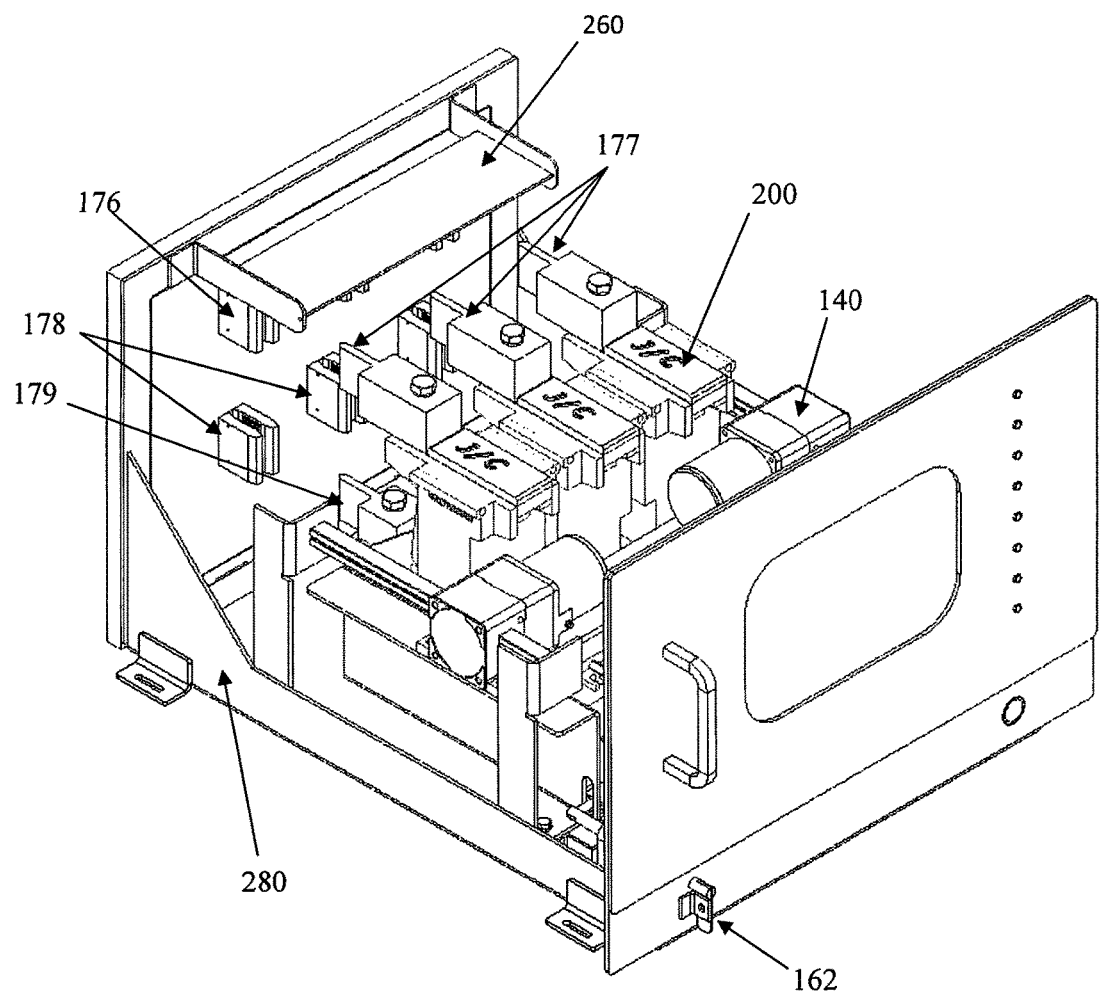
FIG. 4 is a left front perspective view of the motorized power cell shown in FIG. 3.

FIG. 3 is a top view of the motorized movable contactor tray of the removable power cell in the open and grounded position and FIG. 4 is a left front perspective view of the motorized removable power cell. The motorized switching assembly moves the incoming source contact blades 176 and outgoing load contact blades 177 from the closed and energized position to the open and grounded position shown in FIG. 3. Although the source incoming voltage has been disconnected from the vacuum interrupter 200, the source multi-fork connector continues to be energized. To prevent unintentional contact with the source incoming voltage, the shutter 260 rotates downward to provide a shield. In the example shown in FIG. 1, the front panel can be hinged (not shown) on one side to allow the power components to be removed and replaced as necessary. As previously described, when the removable motorized power cell is in the open and grounded position, the outgoing load side connectors 178 are grounded.

Figure 5A:
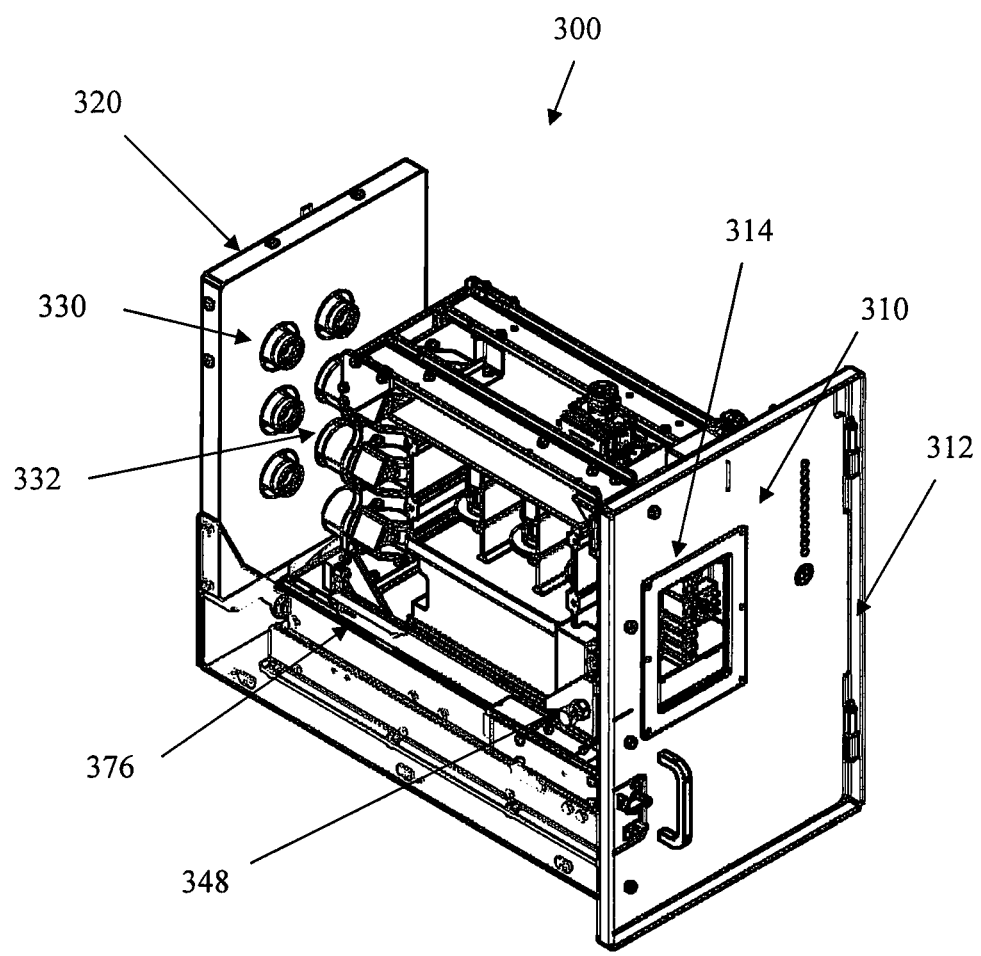
FIG. 5a is a perspective view of another embodiment of the motorized vacuum isolation switch (MVIS) assembly.

FIG. 5a shows another embodiment of the motorized vacuum interrupter switch 300. Like the previously described motorized power cell, the rear panel 320 includes stationary insulated source connectors 330 and stationary insulated load connectors 332 and the front panel includes stationary insulated grounding terminals 342. The removable contactor bucket 350 includes mating movable insulated source 356 and insulated load terminals 358 that are either in a closed and energized position or an open and grounded position as shown in FIG. 5a. However, the slim line motorized vacuum interrupter switch 300 shown in FIG. 5a is configured with the motor assembly 370 below the contactor bucket 350, thus reducing the weight of the removable contactor bucket 350.

Figure 7:
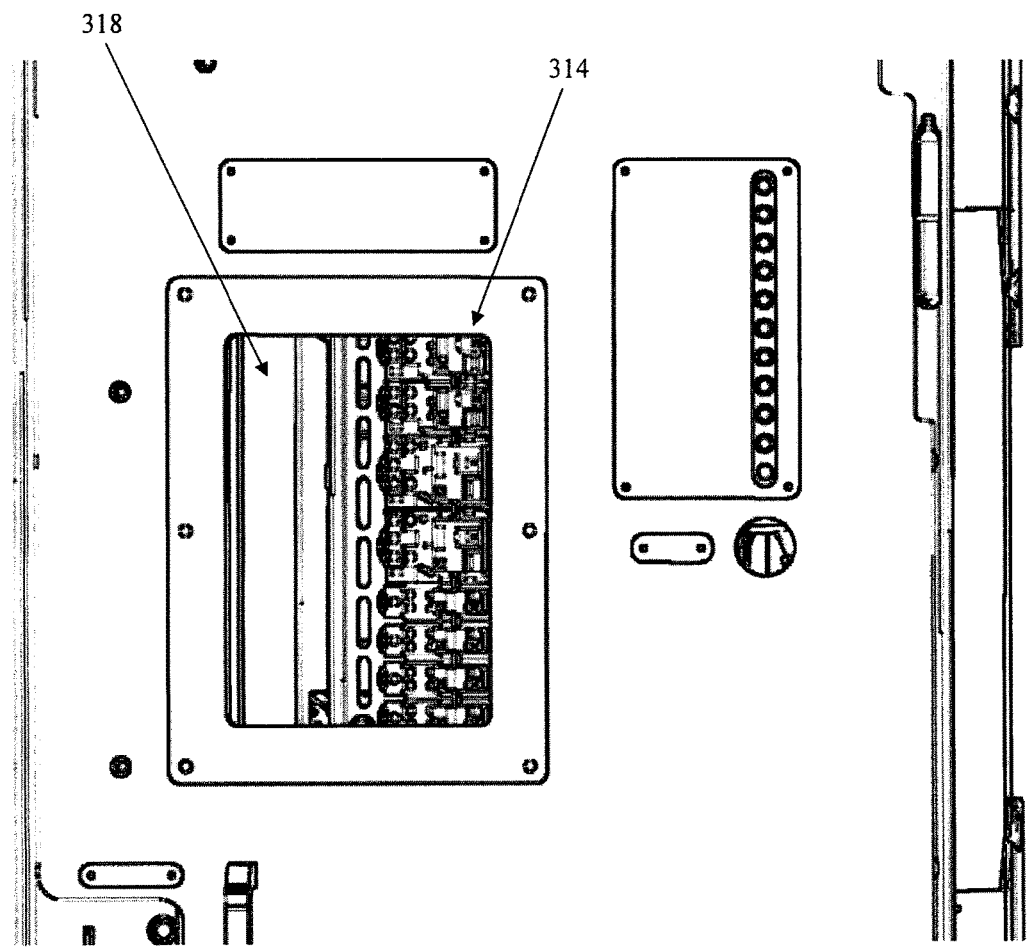
FIG. 7 is a front view of the MVIS showing the visible disconnect.
Figure 8:
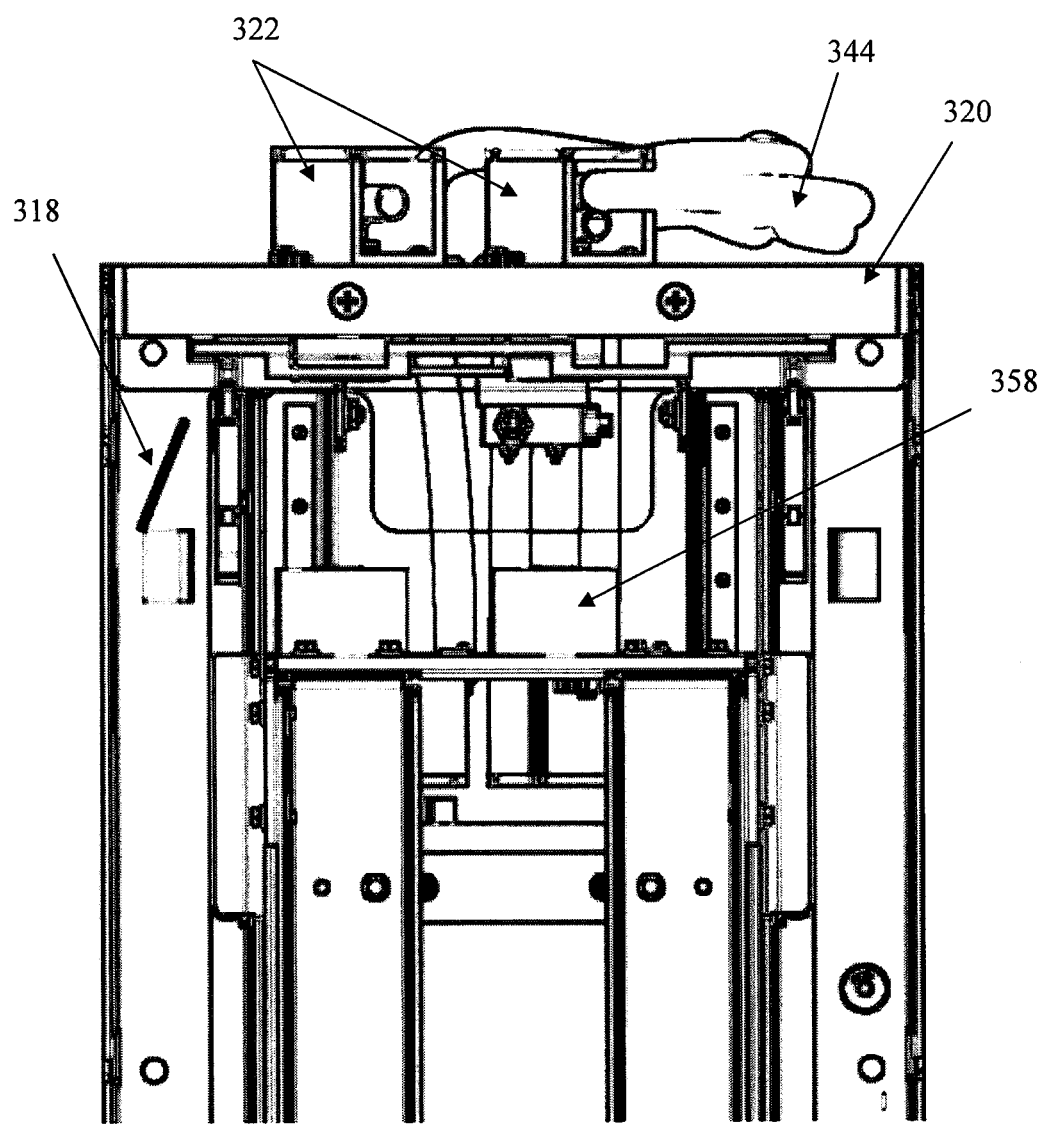
FIG. 8 is a top view showing an example of a mirror position for viewing the disconnect status.

As shown in FIG. 5a, the front panel 310 of the stationary switch enclosure 300 includes a viewing window 314 to visually determine the position of the contactor bucket 350 and view the stuck bottle indicator 316. A non-conductive reflective panel 318 can be installed on internal side wall of the stationary switch enclosure to assist in visually verifying that the movable insulated line 356 and load terminals 358 are disconnected from the stationary rear insulated line 330 and load 332 connectors on the real panel 320 of the stationary switch enclosure. FIG. 7 shows a reflective surface 318 on the interior side panel of the isolation switch enclosure to show a reflection of the insulated line connectors and terminals connection status, a statutory requirement. FIG. 8 is a top view of the isolation switch 300 showing another example of a mirror 318 attached to allow an operator to view the connection status through the front panel window shown in FIG. 7.

Figure 6A:
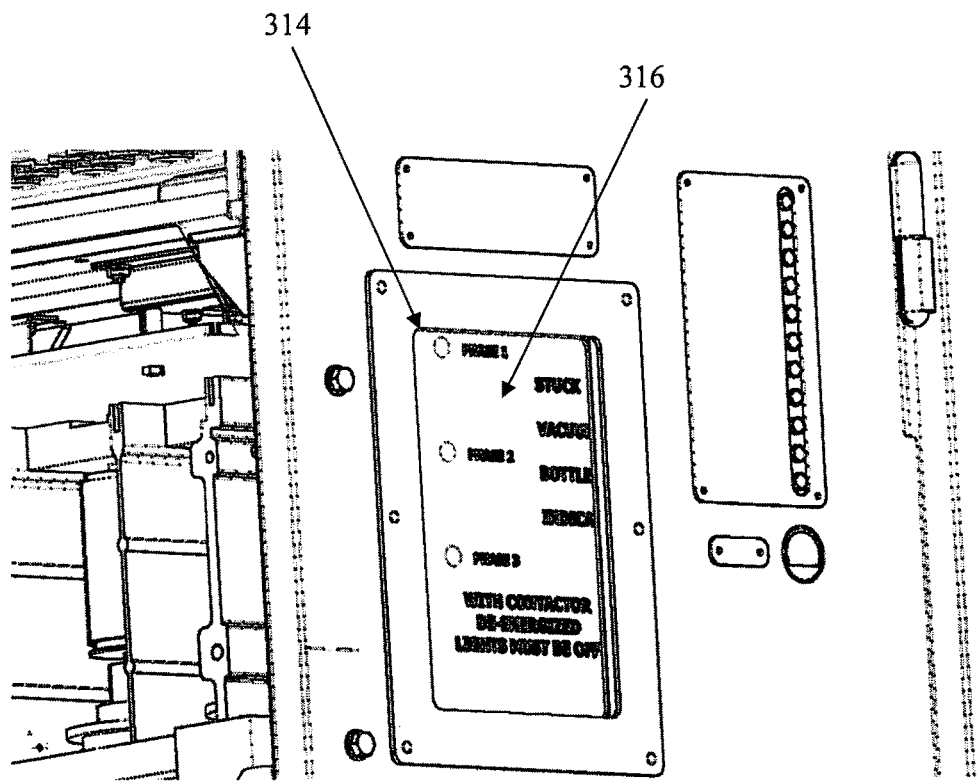
FIG. 6a is a front view of the MVIS dead front panel showing the stuck bottle indicator.
Figure 6B:
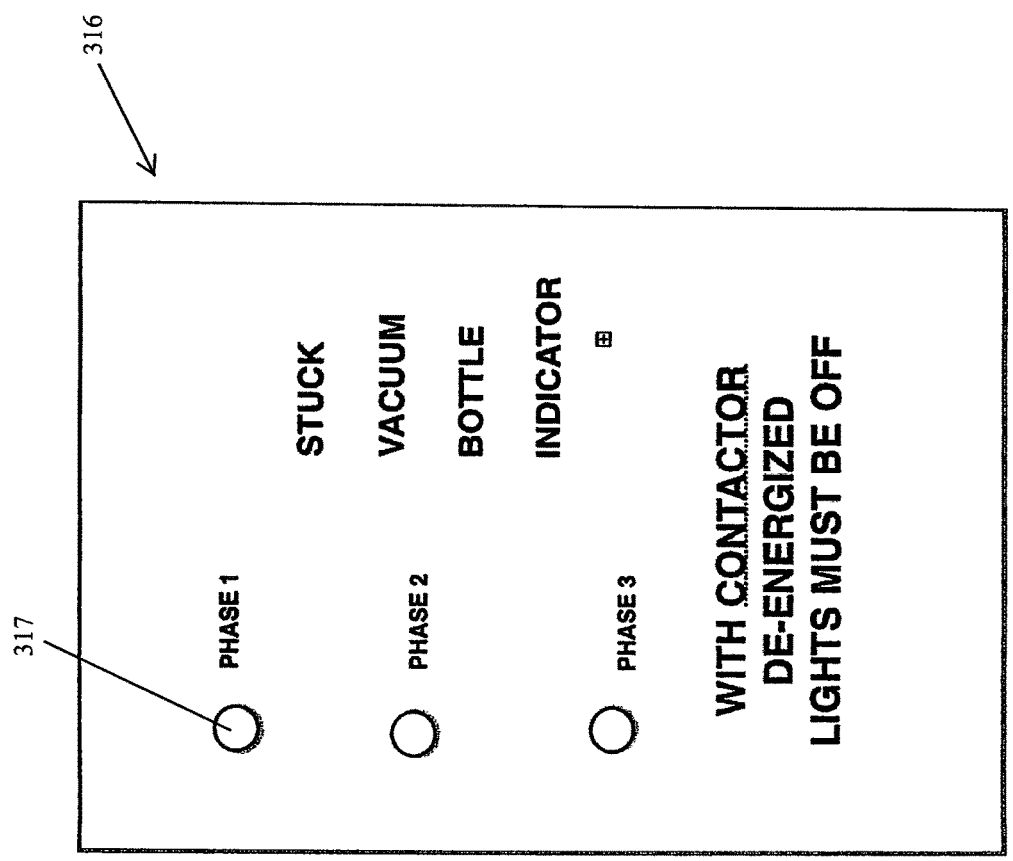
FIG. 6b shows an example of a stuck bottle indicator panel.

FIG. 6a shows an example of a stuck bottle indicator panel 316 that is also viewable through the viewing window 314. FIG. 6b shows the stuck vacuum bottle indicator display panel 316 with an indicator 317, such as an LED, for each phase of the power source. As shown, with the contactors de-energized (open position), the lights must be off before the front door 312 is opened. The stuck vacuum bottle indication panel 316 is attached to the front of the contactor bucket 350.

Another safety feature of the present motorized vacuum isolation switch 300 is a dead front panel 310. A dead front panel 310 on the isolation switch 300 refers to front panel without live electrical parts exposed to a person positioned in front of the energized isolation switch 300. The dead front panel 310 is accomplished by insulating the live internal electrical components that are adjacent to the front panel 310. This is a particularly important safety feature for equipment used in the underground mining industry where arc flash can cause serious injury to operators. An arc flash can occur due to a buildup of contamination, such as coal dust, inside the electrical equipment module.

Unlike the prior art grounding stab contacts that were twisted for mating engagement with two-prong fork contacts, the motorized vacuum isolation switch 300 includes movable non-rotating ground post terminals 354 on the front of the contactor bucket 350 to improve reliability. When the isolation switch 300 is in the open position, the movable ground post terminals 354 are connected with the stationary insulated grounding connectors 342 such that when the movable contactor pan 376 moves to the open and grounded position, the rear floating insulated load connectors 332 are connected to a single point ground. This provides an electrical discharge path for the load. The connection of the rear floating insulated load connectors 332 to ground when the switch is in the open position is a statutory requirement.

Figure 5B:
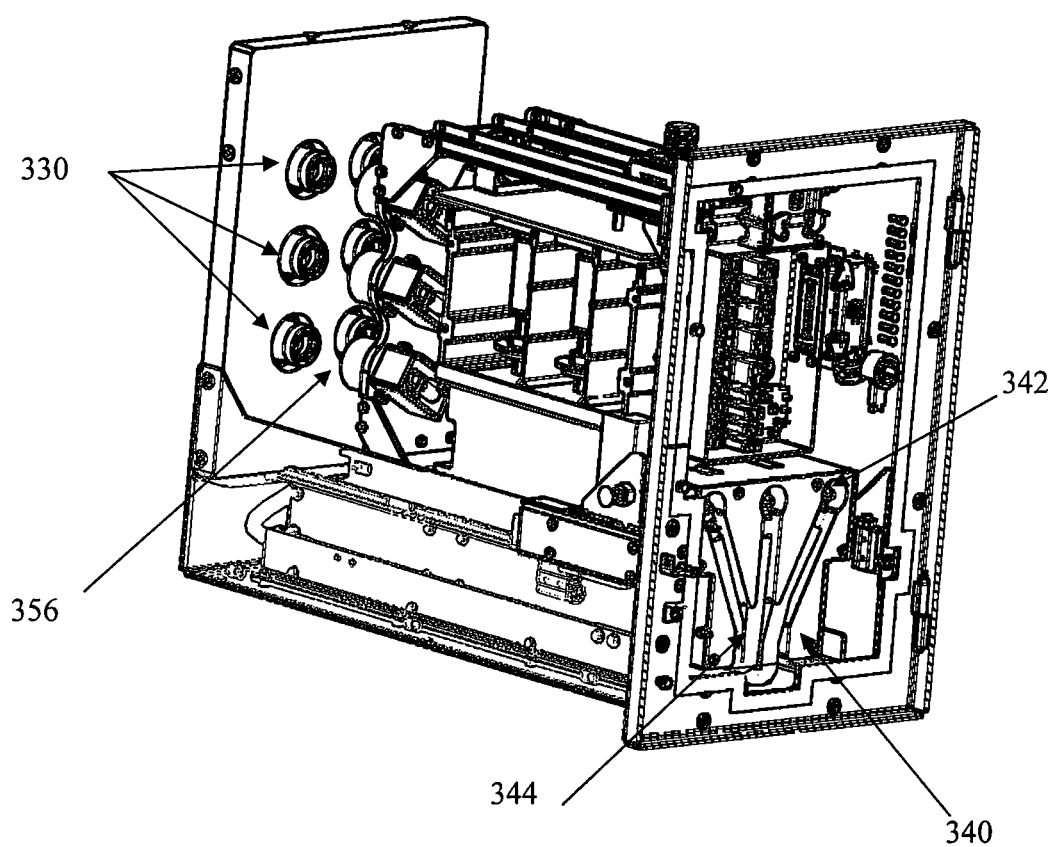
FIG. 5b is a perspective view of the motorized vacuum isolation switch assembly with the front door removed.
Figure 9:
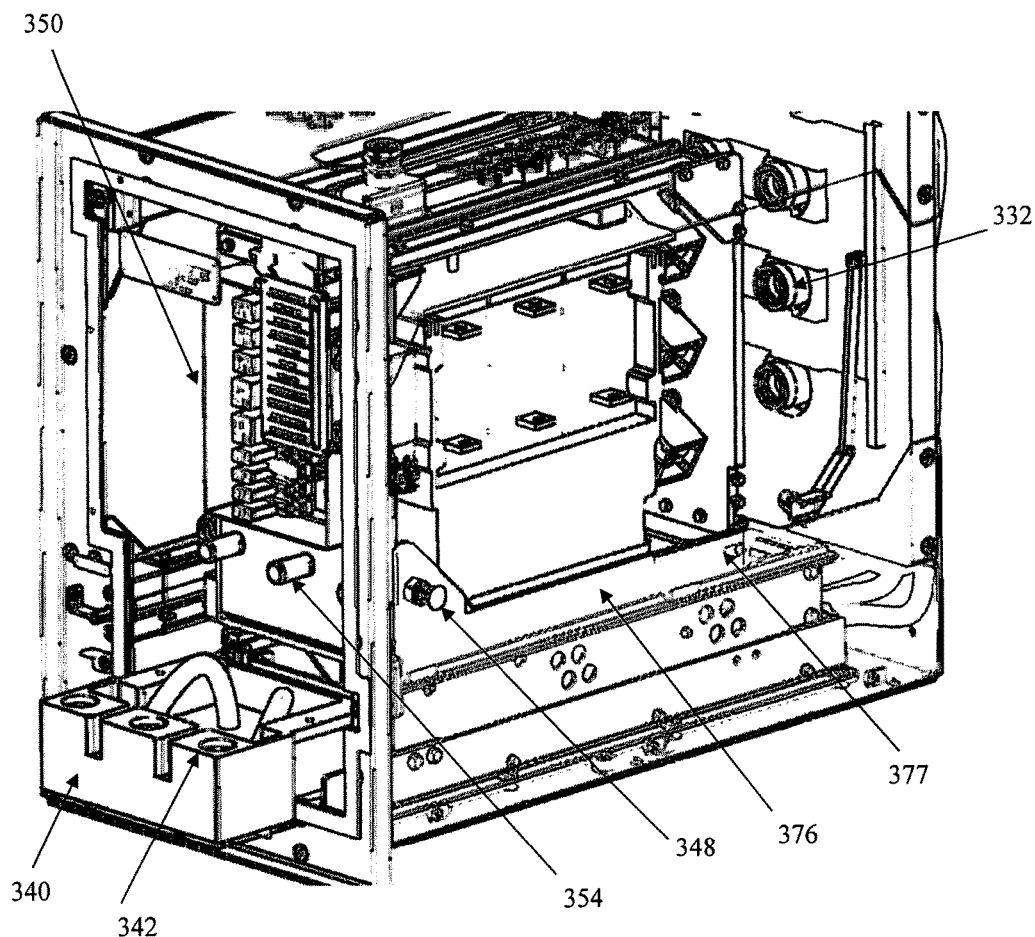
FIG. 9 is a side view showing the insulated grounding block in a rotated position for removing and installing the bucket.

FIG. 5*b* is a front view showing the insulating grounding block 340 molded with recessed channels for routing the ground wires 344 to the stationary insulated ground connector 342. FIG. 9 shows the insulating grounding block 340 flipped downward out of the path of the contactor bucket 350, showing both the movable grounding terminal 354 on the contactor bucket 350 and the stationary insulated connector 342.

Figure 10:
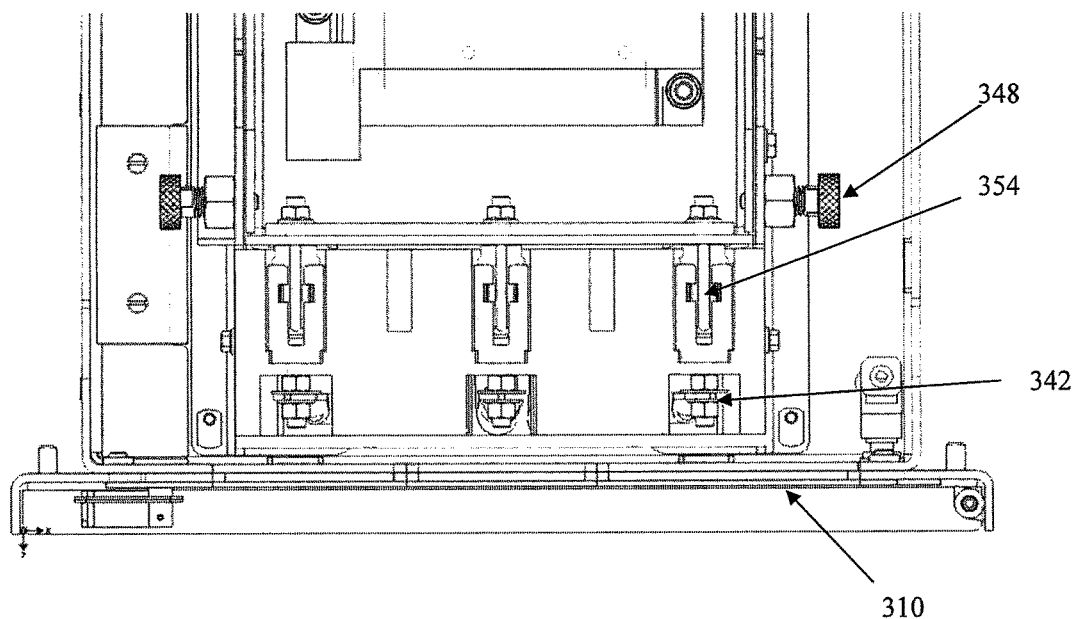
FIG. 10 is a top view of the MVIS grounding assembly in the open and grounded position.

The electrical components close to the front panel 310 include the grounding wires 344 and insulated ground connectors 342 as shown in FIGS. 8-10. When the motorized vacuum isolation switch 300 is energized, a load voltage potential is applied to the stationary insulated grounding connectors 342 shown in FIG. 9. In the dead front panel design, the stationary grounding connectors 342 adjacent to the front panel 310 are insulated within the insulating grounding block 340 as shown in FIG. 9. The mating movable grounding contacts 354 on the contactor bucket 350 shown in FIG. 9 are grounded and not connected until the motorized vacuum isolation switch 300 is in the open and grounded position with the movable grounding terminals 354 in mating engagement with the stationary insulated grounding connectors 342 as shown in FIG. 10.

Insulating the live components also seals the components to prevent atmospheric contamination that could cause an arc flash over, that can cause a blast that can result in a door or cover blow out seriously injuring to an operator within close proximity to the blast exposing personnel to copper vapor in excess of 9000 degrees. An investigation following the blast can shut down operation in the mine for an extended period of time as well as the time required to replace and repair equipment not to mention untold human pain and suffering.

Figure 14:
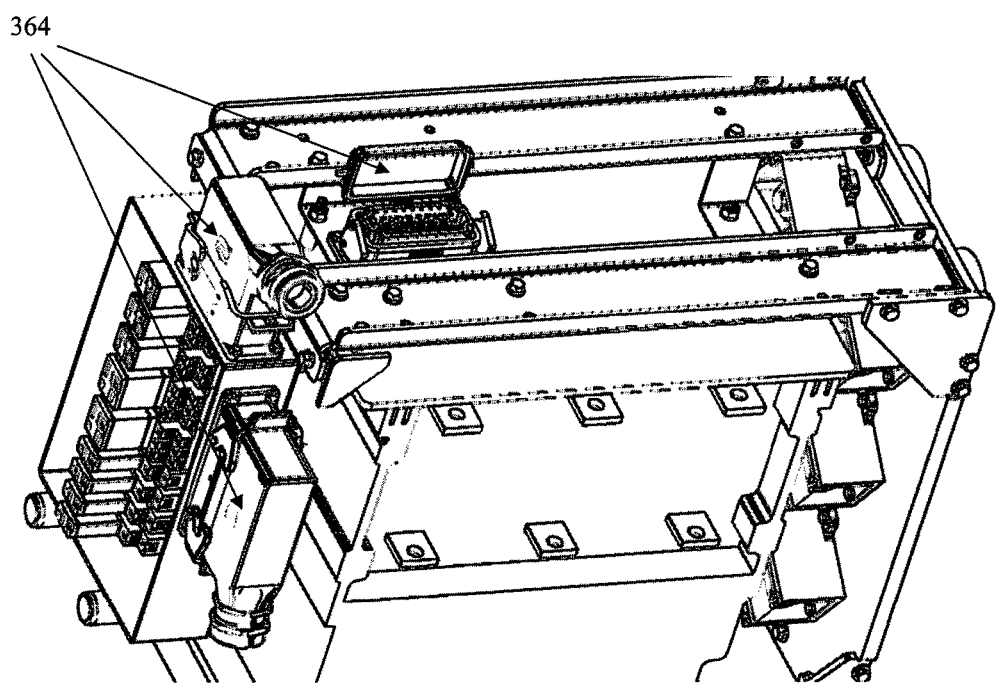
FIG. 14 shows the quick disconnect control connections of the MVIS bucket assembly.

The motorized vacuum isolation switch 300 of the present invention also includes fast acting control wire disconnects 364 as shown in FIG. 14 for quick removal of the contactor bucket 350 from the switch frame for maintenance, repair or replacement. The contactor bucket 350 shown in FIG. 9 shows the movable grounding terminals 354 located below the stuck vacuum bottle indicator panel. The motorized vacuum isolated switch 300 includes an insulated grounding block 340 hingedly attached to the bottom of the stationary frame for mating engagement of the stationary insulated connectors 342 with the movable grounding terminals 354 when the contactor buckets is in the open and grounded position shown in FIG. 9. The insulated grounding connectors 342 are connected to a single point ground with a quick disconnect grounding connector on one side of the stationary track side rail.

Unlike the free-air grounding switch contacts of the prior art, the insulated grounding switch assembly shown in FIG. 5*b* and FIG. 10 includes fixed fully insulated grounding connectors 342 embedded into the insulation grounding block 340 and interconnected to the single point ground. The insulated grounding block assembly 340 can be connected to the stationary contactor frame with four bolts.

The insulated grounding block 340 assembly is movably attached to the stationary switch frame approximately adjacent to the dead front panel 310. When the isolation switch 300 is in the open and grounded position, the switch front panel cover can be opened as shown in FIG. 5*b* to gain access to the contactor bucket 350. In a preferred embodiment, the contactor cover is a removable door. In the normal operating position, the insulated grounding block assembly 340 is located below the stuck vacuum bottle indicator panel. With the door in the open or removed position, the insulated grounding block assembly 340 can be pivoted downward to allow access for removing the contactor bucket 350 from the movable contactor pan 376.

The fixed insulated grounding block assembly 340 can be quickly repositioned by removing the four bolts that attach the insulated grounding block assembly 340 to the contactor bucket 350. After the insulated grounding block assembly 340 is repositioned, the contactor bucket 350 is removable from the movable contactor pan 376 with two spring loaded contactor bucket interlock plunger pins 348, one on each of the right and left sides of the movable contactor pan 376 that mate with corresponding apertures 349 in the side panels of the contactor bucket. After the two spring loaded contactor bucket interlock plunger pins are disengaged, the contactor bucket 350 can be pulled to disengage the contactor bucket keyways 377 from the shoulder bolts on the rear of the contactor pan 376 to fully detached the contactor bucket from the movable contactor pan 376 and remove the bucket from the switch enclosure.

When a contactor bucket 350 is reinstalled in the stationary frame, the contactor pan rear keyways 377 shown in FIG. 9 engage with the shoulder bolts on the back of the contactor pan 376. Once engaged, the spring loaded bucket interlock plunger pins 348 automatically snap into place attaching the contactor bucket 350 to the movable contactor pan 376. As described, the contactor bucket 350 is secured to the movable contactor pan 376 with four point latching to allow the contactor bucket 350 to be moved by the contactor pan 376 driven by the motorized rack and pinion assembly located below the movable contactor pan 376 as shown in FIG. 17.

Figure 17:
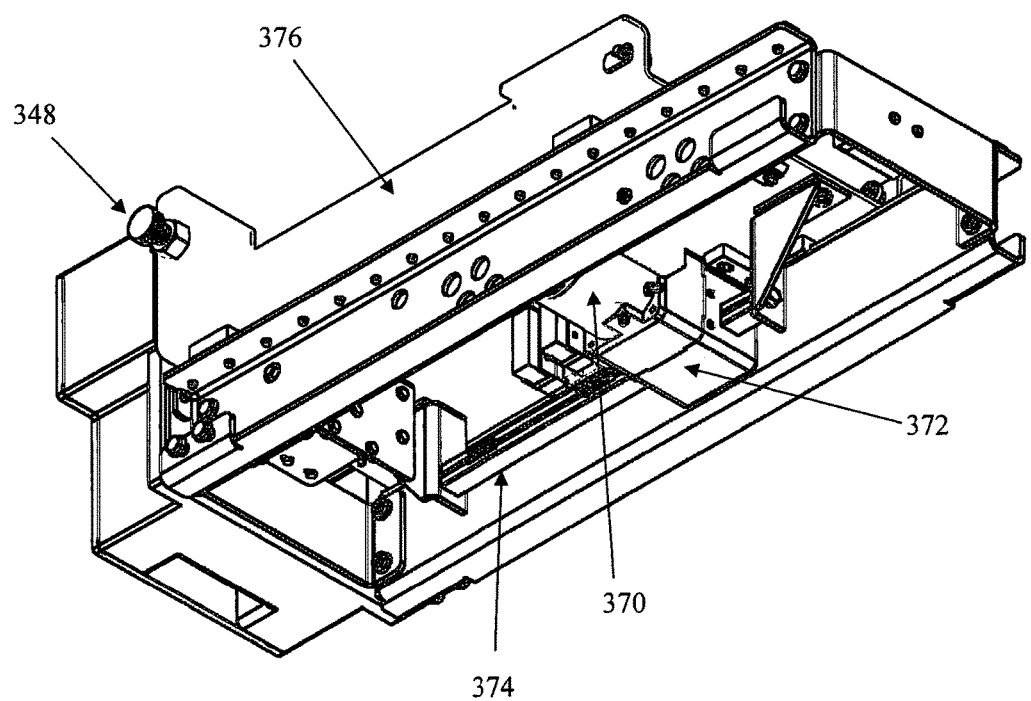
FIG. 17 is a bottom view of the MVIS assembly with the contactor bucket removed.

FIG. 17 is a bottom view of the motor assembly 370 attached to the bottom of the stationary housing. As shown, the motor 370 bolted to the bottom of the contactor pan 376 drives the pinion gear 372 that engages with the stationary rack 374 to move the contactor pan 376 along the stationary rack 374. As previously described, the contactor bucker 350 is attached to the contactor pan 376 with four point latching, two points at the rear of the contactor pan and two points at the front sides of the contactor pan.

The configuration of the electrical components including insulating the components rather than adding barriers and or shutters, and attaching the motor assembly to the switch frame, reduces the weight and the size of the contactor bucket to allow removal of the contactor bucket from the stationary enclosure by one person.

Figure 15:
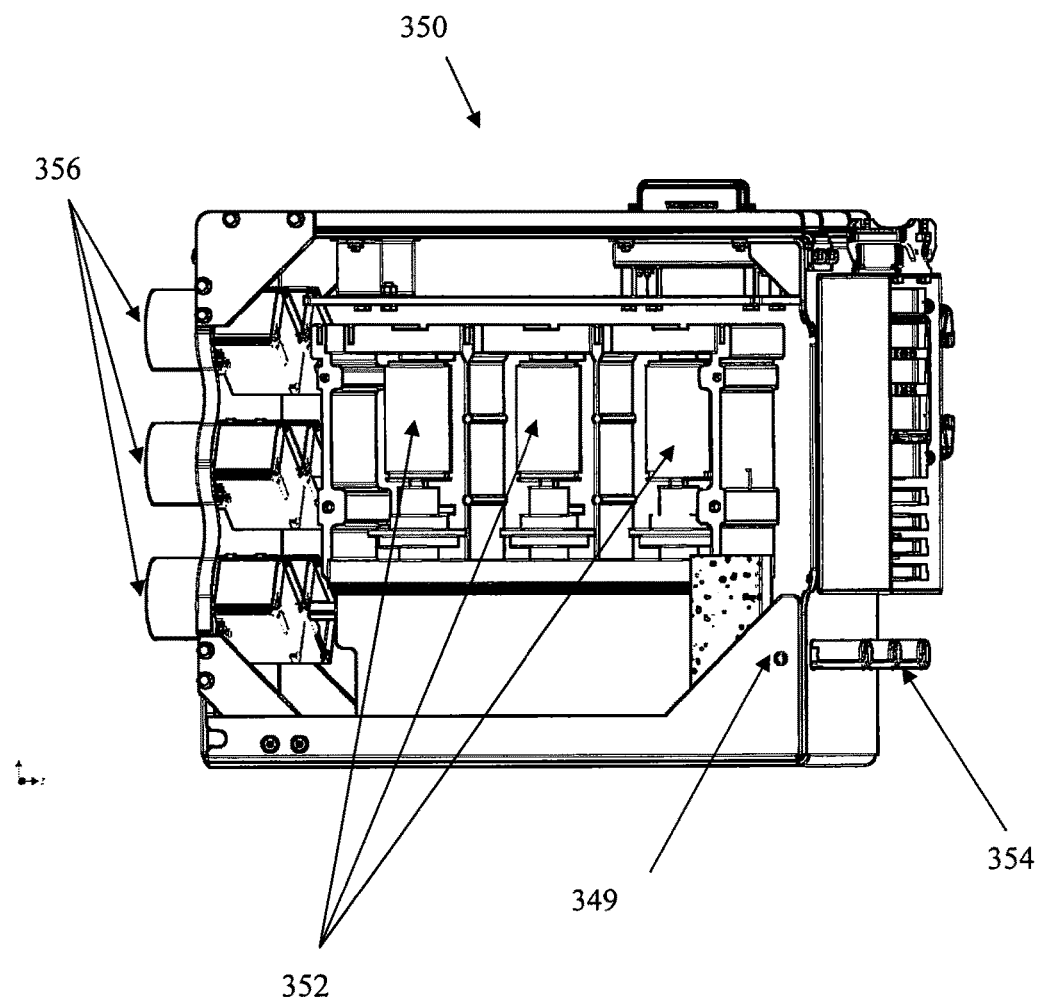
FIG. 15 is a perspective left side view of the MVIS bucket showing the insulated circuit interrupters.
Figure 16:
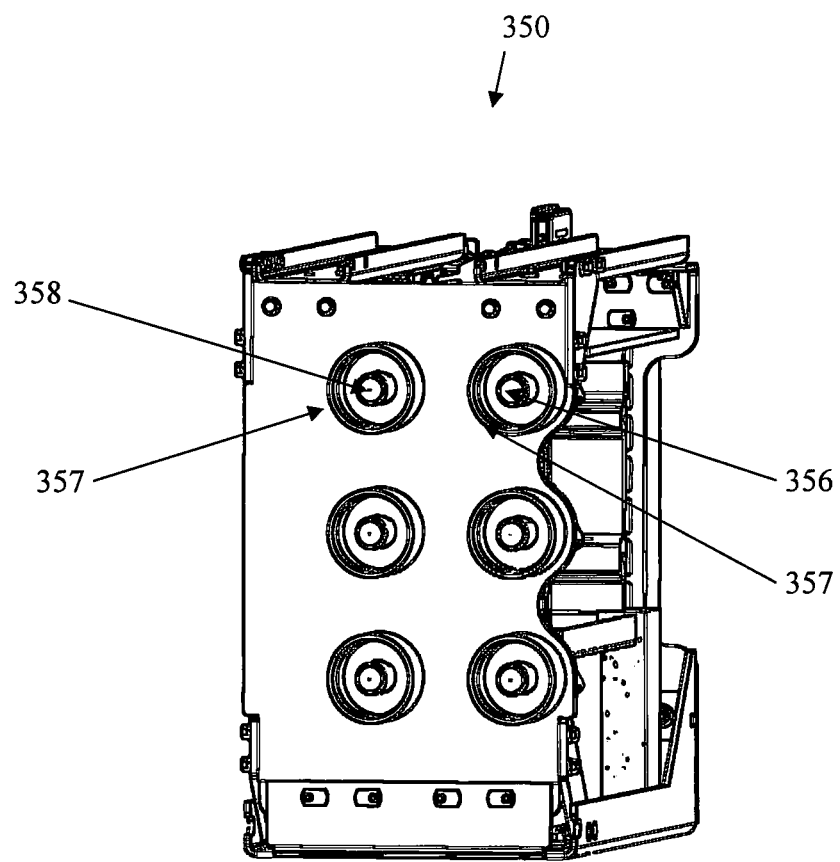
FIG. 16 is a rear view of the contactor bucket removed from the MVIS assembly.

Other components, such as the vacuum interrupters 352 are insulated as shown in FIG. 15. Likewise, the movable input 356 and output terminals 358 on the rear of the contactor bucket 350 shown in FIG. 16 are insulated for connection to the stationary insulated incoming source 330 and outgoing load 331 connectors on the rear panel 320 of the isolation switch 300. As shown in FIG. 5*a*, the line and load terminals 356 and 358 terminals are surrounded with a terminal insulator 357 that mates with the floating insulating line and load connectors on the rear isolation switch panel 320.

Figure 11:
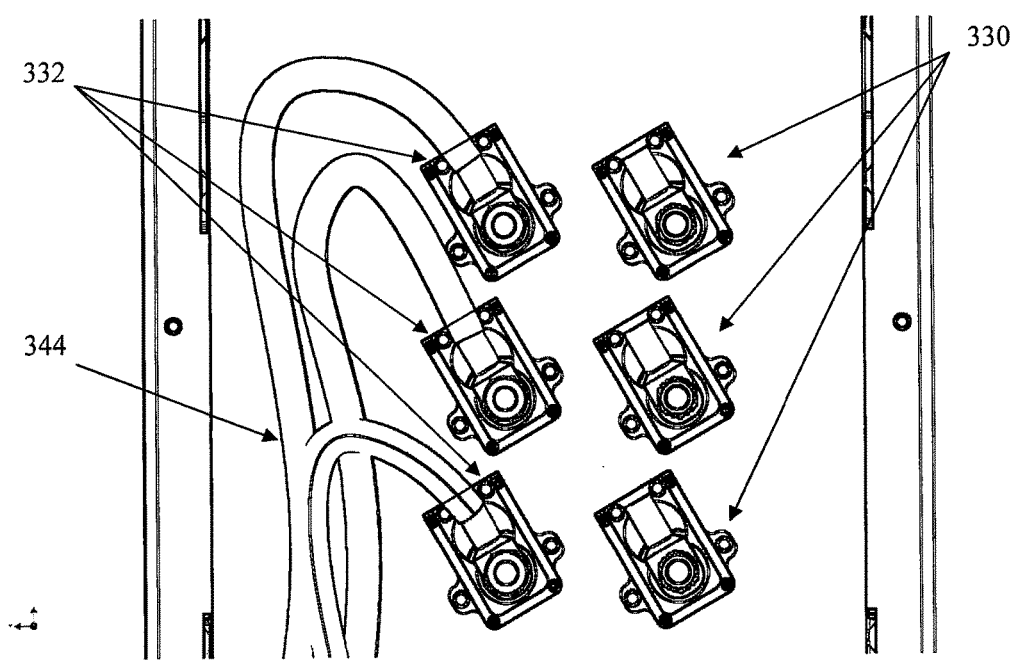
FIG. 11 is shows the rear panel of the MVIS assembly.
Figure 12:
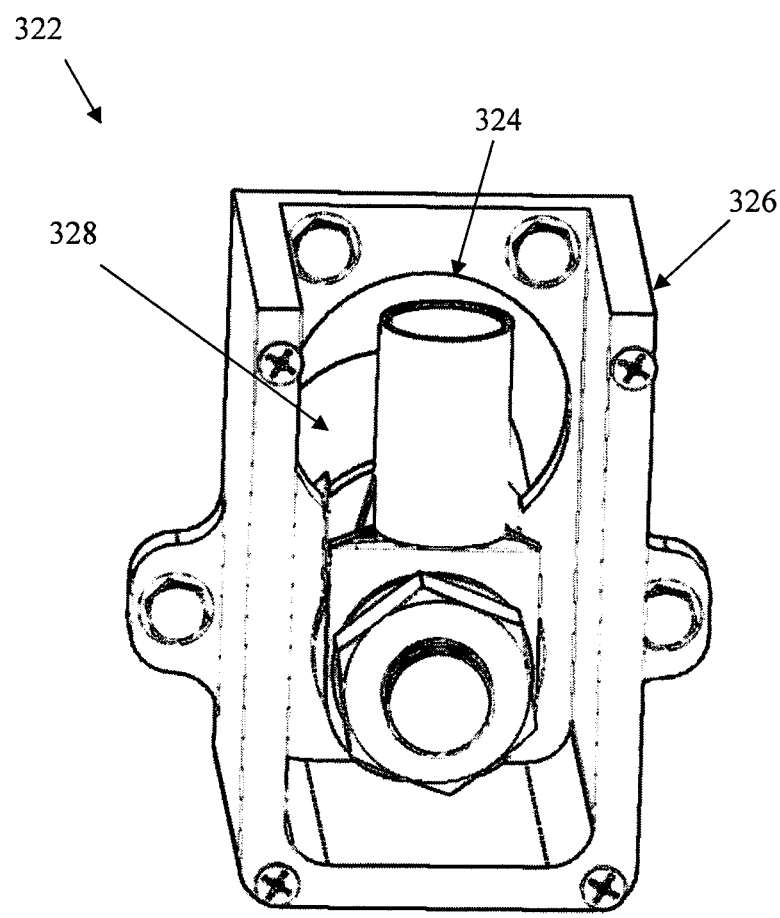
FIG. 12 is a perspective view of a floating contact assembly.

FIG. 11 shows the motorized vacuum isolation switch 300 rear panel 320. The primary incoming line connectors 330 and outgoing load connectors 331 attached to the switch enclosure rear panel 320 are both insulated. As shown there are two adjacent columns, three rear floating line connector assemblies (right) and three load connector assemblies (load), one for each phase. FIG. 12 shows a rear view of the rear floating contact assembly 322 and FIG. 13 shows a side view of the rear floating connector assembly shown in FIG. 12.

The floating connector insulator housing 326 is bolted to the rear panel 320 as shown in FIGS. 11 and 12 over a skeleton key shaped aperture 324 shown partially in FIG. 12. The skeleton key shaped aperture 324 allows one end of the hourglass shaped insulating sleeve 328 to pass through the larger portion of the skeleton key shaped aperture 324 and the central neck portion 327 slides downward into the slot portion of the skeleton key shaped aperture 324. This configuration locks the insulator housing 326 to the rear stationary panel 320 but allows the primary insulator sleeve 328 to "float" within the skeleton key shaped aperture 324 for self alignment. The primary insulator sleeve 328 and skeleton key shaped aperture 324 also allows the rear connectors 322 to be located closer together to reduce size and weight of the motorized vacuum isolation switch 300 while increasing safety.

Figure 13:
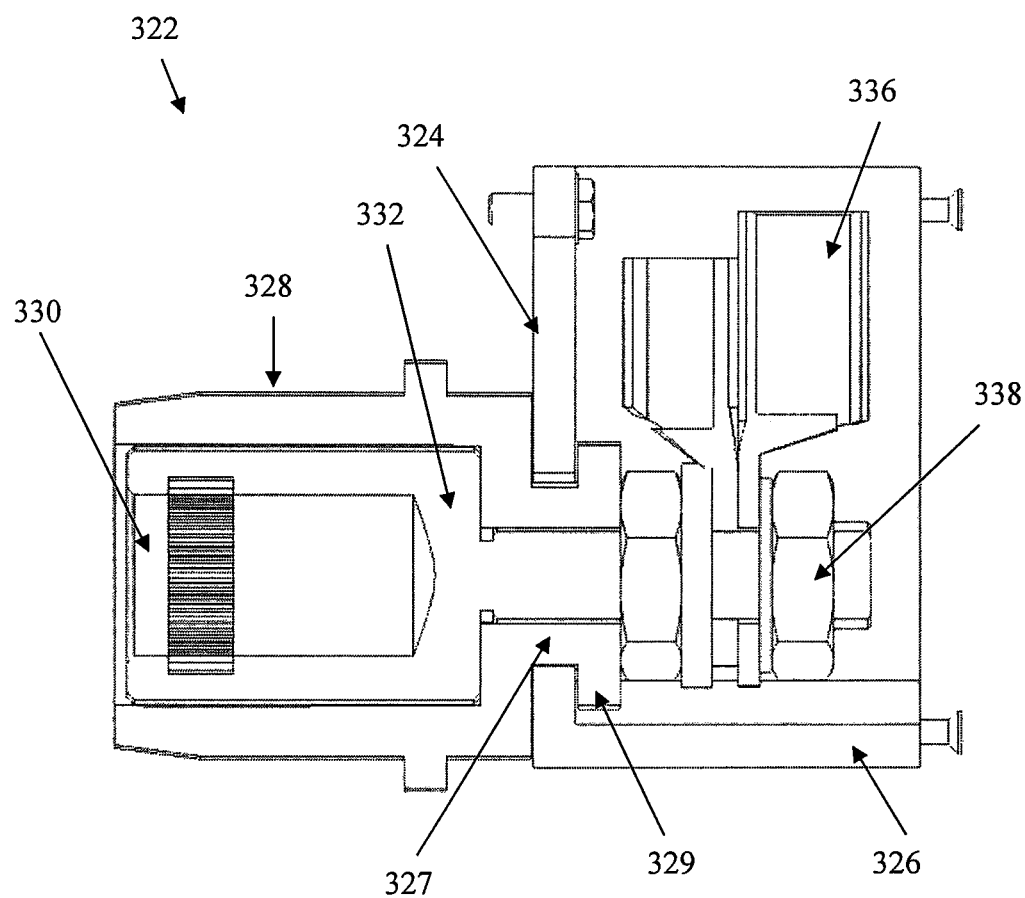
FIG. 13 is a side cutaway view of the floating contact assembly shown in FIG. 10.

As shown most clearly in FIG. 13, the rear connector 330 is surrounded by the hourglass shaped insulating sleeve 328. The insulating sleeve 328 consists of three different areas, the front section covering the connector 330 internal to the switch enclosure, the rear section 329 extending out of the rear panel 320 and the recessed neck section 327 that holds the rear floating connector assembly 322 within the skeleton key shaped aperture 324. As shown in FIG. 11 and FIG. 13, the source and load bus bar leads are connected to the rear connector assembly 322 via terminal lugs 336 and terminal nuts 338.

The skeleton key slot design provides contact float for self-alignment of the mating stationary insulated connectors 330 and 332 with the movable insulated terminals 356 and 358. The rear panel skeleton key shaped aperture 324, the hourglass shaped primary insulator sleeve 328 combined with the multilam connector allows for self alignment of the stationary connectors and movable insulated terminals, eliminating the need for perfect alignment for current ratings. This design configuration is especially important for equipment subjected to vibration and or shock since it expands the tolerance to prevent "hot spots" resulting from connector pins that are not perfectly aligned.

A previously discussed, the movable source terminals 356 and movable load terminals 358 on the rear of the contactor bucket 350 shown in FIG. 15 are also insulated. As the contactor bucket 350, and thus the insulated movable source terminals 356 and load terminals 358 is moved into mating contact with the stationary insulator connectors, the "floating" rear source and load connectors assembly self align with the movable insulated terminals.

The insulated stationary connectors and insulated movable terminals provide added safety to operators when the contactor bucket is removed from the vacuum isolation switch 300 enclosure, thus eliminating the need for a shutter assembly to move into position to cover the rear panel line and load connectors. Prior art contactor buckets are heavy and require two operators to remove the contactor bucket from the switch housing. Incorporating insulated components reduces the size and the weight of the contactor bucket making it removable by one single operator.

The rear floating connector assembly 322 can house a multiliam connector. Multi-contact, multilam female connectors provide a low insertion force connection between the stationary multilian connector and the movable male terminals required to provide maximum current continuously and under a fault condition. The multilam connector design provides slots between adjacent contact blades for alignment with the mating male contact post and to clamp down during mating as the multilam contact applies a spring force to the mating post terminal.

Other safety features shown in FIG. 17 include a motor driven contactor pan 376 described above and electro-mechanical safety interlocks 380. The motorized vacuum isolation switch includes a motor driven rack and pinion gear 372 and stationary rack gear 374 that selectively moves contactor pan 376 between a connected and energized position and an open and grounded position. Unlike the mechanical interlocks of the conventional switching equipment, the motorized vacuum isolation switch 300 includes an electro-mechanical interlock provision 380.

Figure 18:
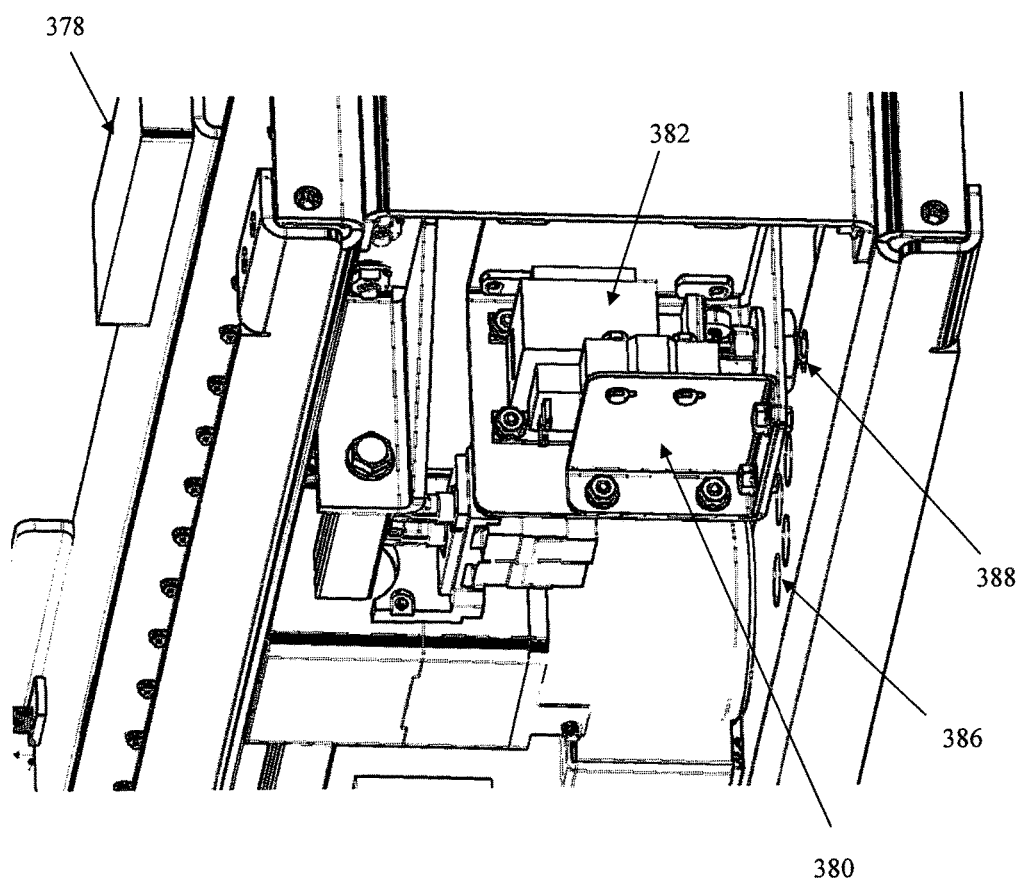
FIG. 18 is a bottom view of the MVIS assembly showing the electro-mechanical interlock in an open position.

An electro-mechanical solenoid 382 shown in FIG. 18 connected to the movable contactor pan 376 locks the movable contactor pan 376 in both the closed and energized position and the open and grounded position. The contactor bucket 350 is removably connected to the upper side of the contactor pan 376. The movable contactor pan 376 includes a mechanical latching mechanism 377 at the rear of the pan 376 to removably latch the contactor bucket onto the contactor pan 376 as previously described in regard to FIG. 15.

The motor driven rack and pinion assembly 370 and the lockout electro-mechanical solenoid 382 are connected to the opposite, bottom side of the movable contactor pan 376. The stationary side rail bracket 386 includes a forward and a rearward lockout aperture 386 and 388 sized to accommodate the solenoid plunger 384 to lock the movable contactor pan 376 in one of the closed and energized position and the open and grounded position.

The electro-mechanical solenoid 382 is energized in response to solenoid signal received from the remotely located control module via the control interface connector 362. The pan electro-mechanical interlock 380 includes an auxiliary control contact to communicate back to the control module (not shown) the status of the lockout electro-mechanical solenoid 382 including a signal indicating that the solenoid is energized and that the plunder 384 is disengaged. For example, prior to moving the contactor pan 376, a first signal is sent to the electro-mechanical solenoid 382 to disengage from the fixed position. In response, the electro-mechanical solenoid 382 disengages the plunger 384 (withdraws the plunger from the lockout aperture) leaving the contactor pan 376 free to move between the open and closed positions.

A plunger-type micro switch attached to the base of the stationary frame provides a contactor pan 376 position signal to the control module. The micro switch is triggered when the movable contactor pan 376 physically moves into and out of contact with the plunger of the micro switch. This provides the control module with a position signal for use in determining when to open and close the vacuum bottle contacts. For example, when the contactor bucket is installed and moved to the closed and energized position, the micro switch sends a contactor position signal, the control module signals for the electro-mechanical solenoid 382 to lock the contactor rack and pinion cage 376 in the closed position and can signal for the contacts of the vacuum bottles to close While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A contactor bucket for installation into a motorized stationary isolation switch enclosure comprising:
   a contactor bucket frame;
   a rear panel with one or more insulated source terminals and one or more insulated load terminals, each source and load terminal pair corresponding to one phase of an electrical power source;
   a front panel with one or more grounding terminals, each one corresponding to one phase of the power source;
   an insulated circuit interrupter for each phase with an input terminal and output terminal and switchable contacts enclosed therein, each one or more insulated source terminals connected to a corresponding circuit interrupter input terminal and each one of the insulated load terminals connected to a corresponding circuit interrupter output terminal and to a corresponding one of the grounding terminals;
   a stuck bottle indicator panel assembly with an indicator corresponding to each one of the insulated circuit interrupters to show an energized state of each corresponding circuit interrupter internal switchable contacts, the indicator panel attached above the one or more grounding terminals; and
   a control interface for controlling a position of the one or more insulated circuit interrupter enclosed switchable contacts.

2. A motorized isolation switch enclosure comprising:
   a frame with a rear panel, two side panels and a removable a front panel;
   a motorized rack and pinion assembly for moving a contactor pan along a stationary rack longitudinally along the base of the frame;
   a set of insulated floating input line connector assemblies attached to the rear panel to supply a source voltage to a contactor bucket insertable into the isolation switch enclosure;
   a corresponding set of insulated floating output load connector assemblies attached to the rear panel spaced apart from the set of floating input line connectors to supply a controlled load voltage from the removable contactor bucket to a load external of the isolation switch enclosure;
   an insulating grounding block assembly with set of ground connectors connected therewith and a corresponding set of ground wires routed along the isolation switch enclosure between the rear panel set of insulated output load connectors and the set of insulated ground connectors;
   an electro-mechanical interlock to controllably lock the contactor pan in an open position and a closed position; and
   a viewing window in the front panel for an operator to view a position of the set of insulated floating input line connectors when the removable contactor bucket is inserted into the isolation switch enclosure.

3. The motorized isolation switch enclosure of claim 2, wherein the rear panel includes a set of skeleton key shaped apertures for each of the set of set of insulated floating input line connectors and a corresponding set of insulated floating output load connectors.

4. The motorized isolation switch enclosure of claim 3, wherein the floating input and output connectors each comprise:
   an hour glass shaped insulated connector assembly embedded, the insulated hour glass connector insertable into a larger portion of the skeleton key shaped aperture with the neck of the hourglass shaped insulated connector slidable into the slot portion of the skeleton key shaped aperture to allow the floating input and output connectors to fixedly move within the skeleton key shaped aperture.

5. The motorized isolation switch enclosure of claim 2, wherein the motorized rack and pinion assembly comprises:
   a motor engaged to turn a pinion gear, the motor connected to a bottom side of the contactor pan;
   a stationary rack gear coupled with the pinion gear to move the contactor pan along the stationary rack.

6. The motorized isolation switch enclosure of claim 2, further comprising:
   an attachment assembly for attaching a removable contactor bucket to the contactor pan to allow the motorized rack and pinion assembly to move the attached removable contactor bucket between the open position and closed position.

7. A motorized isolation switch comprising:
   a switch enclosure including a frame with a rear panel, two side panels and a front panel;
   a set of fixed insulated floating input line connectors and a corresponding set of fixed insulated floating output load connectors movably fixed to the rear panel, each one in the set corresponding to a different phase;
   a removable contactor bucket insertable into the isolation switch enclosure with mating movable insulated line terminals and load terminals and a set of insulated circuit interrupters, each insulated circuit interrupter with an input and an output terminals and switchable contacts therein, the insulated circuit interrupter input and output terminals connected between one of the movable insulated line terminals and load terminals corresponding to each phase;
   a motorized rack and pinion assembly connected to a base of the switch enclosure, the motorized rack and pinion assembly coupled for moving a contactor pan connectable to the contactor bucket along a stationary rack gear along the base of the switch enclosure between a switch open position and a switch closed position;
   an insulating grounding block assembly with set of ground connectors insulated therein connected adjacent to the removable front panel, the contactor bucket with a corresponding set of movable ground terminals connected to a front of the contactor bucket to mate with the insulated ground connectors in the switch open position; and
   ancillary controls for communicating with remotely located controls to electrically control the operation.

8. The motorized isolation switch of claim 7, further comprising:
   a viewing window in the front panel for an operator to view a position of the set of insulated floating input line connectors when the removable contactor bucket is inserted into the isolation switch enclosure.

9. The motorized isolation switch of claim 8, further comprising:
   a stuck bottle indicator panel assembly with an indicator corresponding to each one of the insulated circuit interrupters to show an energized state of each corresponding circuit interrupter internal switchable contacts, the indicator panel attached above the insulating grounding block.

10. The motorized isolation switch of claim 7, further comprising:
   a mirror surface along one side panel of the switch enclosure such that a reflection of the set of fixed insulated floating input line connectors is viewable through the viewing window.

11. The motorized isolation switch of claim 7, wherein the insulating grounding block assembly includes a corresponding set of ground wires routed along the isolation switch enclosure between the rear panel set of insulated output load connectors and the set of insulated ground connectors, the set of ground wires connected at a single point ground.

12. The motorized isolation switch of claim 7, further comprising:
   an attachment assembly for attaching the removable contactor bucket to the contactor pan to allow the motorized rack and pinion assembly to move the attached removable contactor bucket between the open position and closed position.

13. The motorized isolation switch of claim 7, wherein the attachment assembly includes two spring loaded contactor bucket interlock plunger pins, one on each of the right and left front sides of the movable contactor pan that mate with corresponding apertures in the front side panels of the contactor bucket to allow for quick removal of the contactor bucket.

14. The motorized isolation switch of claim 13, wherein the attachment assembly further includes a pan keyway on each of the right and left rear side panels to mate with right and left shoulder bolts on the rear of the contactor pan to allow for quick removal of the contactor bucket.

15. The motorized isolation switch of claim 7, wherein the motorized rack and pinion assembly comprises:
   a motor connected to rotate a pinion gear, the motor and pinion gear connected to the bottom side of the contactor pan; and
   a rack gear connected to the base of the switch enclosure coupled with the pinion gear such that as the pinion gear is rotated by the motor, the contactor pan moves between the switch open and switch closed position.

16. The motorized isolation switch of claim 7, further comprising:
   an electro-mechanical interlock connected to the bottom side of the contactor pan to controllably lock the contactor pan in one of the open position and the closed position.

17. The motorized isolation switch of claim 16, wherein the electro-mechanical interlock comprises:
   an electro-mechanical solenoid with a plunger pin to mate with an open position aperture and a closed position for controllably interlocking the contactor pan in position.

18. The motorized isolation switch of claim 7, further comprising:
   a control connector attached to the contactor bucket for controlling the motorized rack and pinion assembly and the circuit interrupter switchable contacts.

19. A motorized isolation switch of claim 7, wherein the front panel is a dead front panel with only insulated electrical components adjacent to the dead front panel.

* * * * *